US007147562B2

(12) United States Patent
Ohara et al.

(10) Patent No.: US 7,147,562 B2
(45) Date of Patent: Dec. 12, 2006

(54) INPUT CHARACTER PROCESSING METHOD

(75) Inventors: Toru Ohara, Tokyo (JP); Haruyuki Hashimoto, Tokyo (JP); Takashi Uryu, Tokyo (JP); Kenjiro Morimoto, Tokyo (JP); Kenich Fujiwara, Tokyo (JP); Makoto Suzuki, Tokyo (JP); Sachiko Kawamura, Tokyo (JP); Yoshihisa Hashimito, Tokyo (JP); Yasuhiro Takahashi, Tokyo (JP); Masato Nakazawa, Tokyo (JP); Shintaro Hata, Tokyo (JP); Atsushi Kanno, Tokyo (JP)

(73) Assignee: Sega Corporation (JP)

( * ) Notice: Subject to any disclaimer, the term of this patent is extended or adjusted under 35 U.S.C. 154(b) by 372 days.

(21) Appl. No.: 10/132,661

(22) Filed: Apr. 26, 2002

(65) Prior Publication Data

US 2003/0017873 A1 Jan. 23, 2003

(30) Foreign Application Priority Data

Apr. 27, 2001 (JP) ............................ 2001-133723

(51) Int. Cl.
*A63F 13/00* (2006.01)

(52) U.S. Cl. ........................................................ 463/42

(58) Field of Classification Search .................... 463/1, 463/30, 31, 34, 37, 42, 43
See application file for complete search history.

(56) References Cited

U.S. PATENT DOCUMENTS

2002/0007395 A1 * 1/2002 Matsuda ..................... 709/204
2003/0179222 A1 * 9/2003 Noma et al. ................ 345/700

FOREIGN PATENT DOCUMENTS

JP 09-081353 3/1997
JP 2000-194728 7/2000

* cited by examiner

*Primary Examiner*—Kim Nguyen
(74) *Attorney, Agent, or Firm*—Dickstein Shapiro LLP

(57) ABSTRACT

Three user characters are displayed in a chat room. When a user inputs a character string, the character string is displayed on the screens of the respective users. When a character string inputted by a user contains a character string "Ha,Ha,Ha", a data table outputs an event corresponding to the character string "Ha,Ha,Ha". All the user characters participating in the chat make a laughing action, uttering the laughing sound "Ha,Ha,Ha". The input character processing method not only can simply transmits utterances of respective participants but also can occur various events.

9 Claims, 21 Drawing Sheets

INPUT CHARACTER PROCESSING METHOD

BACKGROUND OF THE INVENTION

The present invention relates to an input character processing method for processing characters inputted by users.

The recent development of the communication techniques enables home video game machines, personal computers, etc. at respective homes to be interconnected with one another through telephone circuits, etc., forming common networks, and information processing apparatuses installed in game centers, game cafes, etc. to be interconnected with one another through special circuits, such as optical fibers, etc., forming common networks. Such networks permit a plurality of game players to participate in common games and the plurality of game players to make real-time conversations with one another.

For example, in games played by a plurality of game participants, the participants can communicate with one another through chats. In real-time chats, participants in the chats makes various utterances, and the utterances are displayed on the screens of the game apparatuses, etc. of the respective participants.

In games and chats, while the participants are watching indications or utterances on the screens, which change one after another, they play the games and utter as they judge.

However, in the conventional games and chats, utterances of respective participants are simply displayed on the screens, which tend to make the chats monotonous.

SUMMARY OF THE INVENTION

An object of the present invention is to provide an input character processing method which not only can transmit utterances to respective participants, but also can cause various events.

The input character processing method according to one aspect of the present invention is for processing a character inputted by a user and is characterized in that when the character contains a specific character, a specific event associated with the specific character takes place.

In the above-described input character processing method, it is possible that characters inputted by a plurality of users for a chat are processed.

In the above-described input character processing method, it is possible that information processing devices operated by the plurality of users are connected to a network; information is shared via the network to thereby form virtual spaces in which the plurality of users can participate; and the plurality of users input characters, and the inputted characters are displayed in images in the virtual spaces of the information processing devices.

In the above-described input character processing method, it is possible that the information processing devices operated by the plurality of users are connected to the network; the information is shared via the network, whereby the plurality of users execute one task in cooperation; and the plurality of users input characters while executing the task.

In the above-described input character processing method, it is possible that the specific event is an event for changing images and/or data of characters of the users, an event for changing an image and/or data of an object, an event for changing an surrounding environment, such as a background, music or others, and/or an event for changing a task.

In the above-described input character processing method, it is possible that the specific character contains a character for controlling the specific event.

In the above-described input character processing method, it is possible that the specific character contains a character for specifying an object in which the specific event takes place.

In the above-described input character processing method, it is possible that the specific event takes place based on a state of the character of the user inputting the character.

In the above-described input character processing method, it is possible that the specific event takes place based on a state of an object in which the specific event takes place.

The game control method according to one aspect of the present invention is characterized in that when a player character has a state in which the player character cannot proceed with the game, prescribed data of the player character is stored, and when the player character resumes the game and reaches the point where he has become incapable of carrying on the game, a prescribed object is displayed.

In the above-described game control method, it is possible that the prescribed object includes a tomb object.

In the above-described game control method it is possible that when the player character comes near the prescribed object, character information of the prescribed data of the character corresponding to the prescribed object is displayed.

The game control method according to one aspect of the present invention is characterized in that a user sets name data for an item he uses in a game, and the name data of the item and data of the user owning the item are registered in a server.

The game control method according to one aspect of the present invention is characterized in that an item to be used in a game is accompanied by history information, and the item and the history information are registered in a server.

In the above-described control method, it is possible that the item can be exchanged among the users.

In the above-described game control method, it is possible that the name data or the history data of the item cannot be rewritten by other user.

The game control method according to one aspect of the present invention is characterized in that in an online game played by a plurality of information processing devices connected thereto, own game data is transmitted from the information processing devices to a server in response to a prescribed indication, and rank information of the own game data decided based on game data of other users stored in the server is downloaded to the prescribed information processing device to display the rank information on a display screen.

The server according to one aspect of the present invention is characterized in that in an online game played by a plurality of information processing devices connected thereto, a rank of the prescribed game data transmitted from a prescribed information processing device is decided based on stored game data of the other users, and the rank information is transmitted to the prescribed information processing device.

The character input method according to one aspect of the present invention comprises indicating a first character; displaying a window with a selectable second character arranged around the first character; and selecting a character to be inputted out of the first character and the second character in the window.

In the above-described character input method, it is possible that the second character is associated with the first character.

In the above-described character input method, it is possible that the window is a cross-shaped window with the first character located at the center; and the second character is selected by indicating a direction originating at the first character.

In the above-described character input method, it is possible that a software keyboard is displayed on the screen; the first character is indicated on the software keyboard; and the window is displayed on the key of the first character on the software keyboard.

In the above-described character input method, it is possible that the first character is indicated by using a button; and the window is displayed on the screen, which is separate from the button.

In the above-described character input method, it is possible that the window is displayed by starting operation of prescribed operation means, and the selected character is decided by finishing the operation of the prescribed operation means.

The game control method according to one aspect of the present invention is for a network game played by a plurality of information processing devices connected to a server, and is characterized in that data of an operation of or a character owned by one player is uploaded from his own information processing device to the server; the server changes the data of the character by a prescribed method; and after a prescribed period of time, the data as changed of the character id downloaded to the information processing device of the player.

In the above-described game control method, it is possible that the prescribed method includes mutually influencing data of characters uploaded to the server to change the data.

The program control method according to one aspect of the present invention is for a prescribed program played by a plurality of information processing devices connected to a network, and is characterized in that based on evaluation made by a plurality of participating users, data of characters operated by the users are changed, or proceeding data of the prescribed program is changed.

The program control method according to one aspect of the present invention is for a prescribed program played by a plurality of information processing terminals linked by wire communication or wireless communication, and is characterized in that based on evaluation made by a plurality of participating users, data of characters operated by the users are changed, or proceeding data of the prescribed program is changed.

As described above, according to the present invention, when a specific character is contained in characters inputted by a user, a specific event associated with the specific character takes place, whereby utterances are not only transmitted to respective participants but also give chats various events.

DETAILED DESCRIPTION OF THE INVENTION

[A First Embodiment]

The network system according to a first embodiment of the present invention will be explained.

(Network System)

Figure 1:
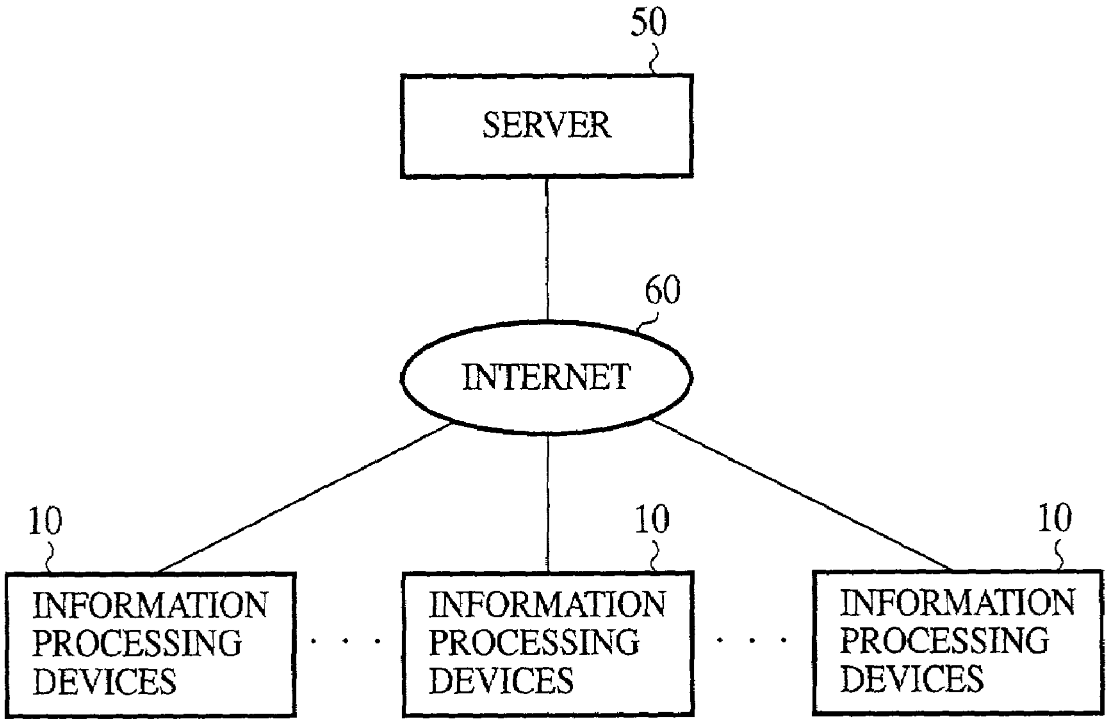
FIG. 1 is a block diagram of the network system according to a first embodiment of the present invention.

A constitution of the network system according to the present embodiment is shown in FIG. 1. In FIG. 1, information processing systems 10 which are terminal systems of a plurality of clients, and a server 50 are connected to an internet 60, forming a network. The information processing systems 10 are, e.g., personal computers and computer game apparatuses, and each includes a control unit provided by a CPU, a display, such as a CRT display, a liquid crystal display or others, and an input device, such as a keyboard, a mouse or others.

(Constitution of Game Apparatus)

A constitution of the game apparatuses as one example of the information processing systems 10 of the network according to the present embodiment will be explained with reference to FIG. 2.

The information processing systems 10 are not limited to home video game machines and can be mobile game machines, mobile terminals, such as mobile telephones, PHSs (Personal Handyphone Systems), PDAs (Personal Digital Assistances) or others, or others. The information processing systems 10 can be terminal devices installed at game centers, game cafes, etc., or electronic devices, such as personal computers or others installed at homes. These devices may be mixed in one network system.

Figure 2:
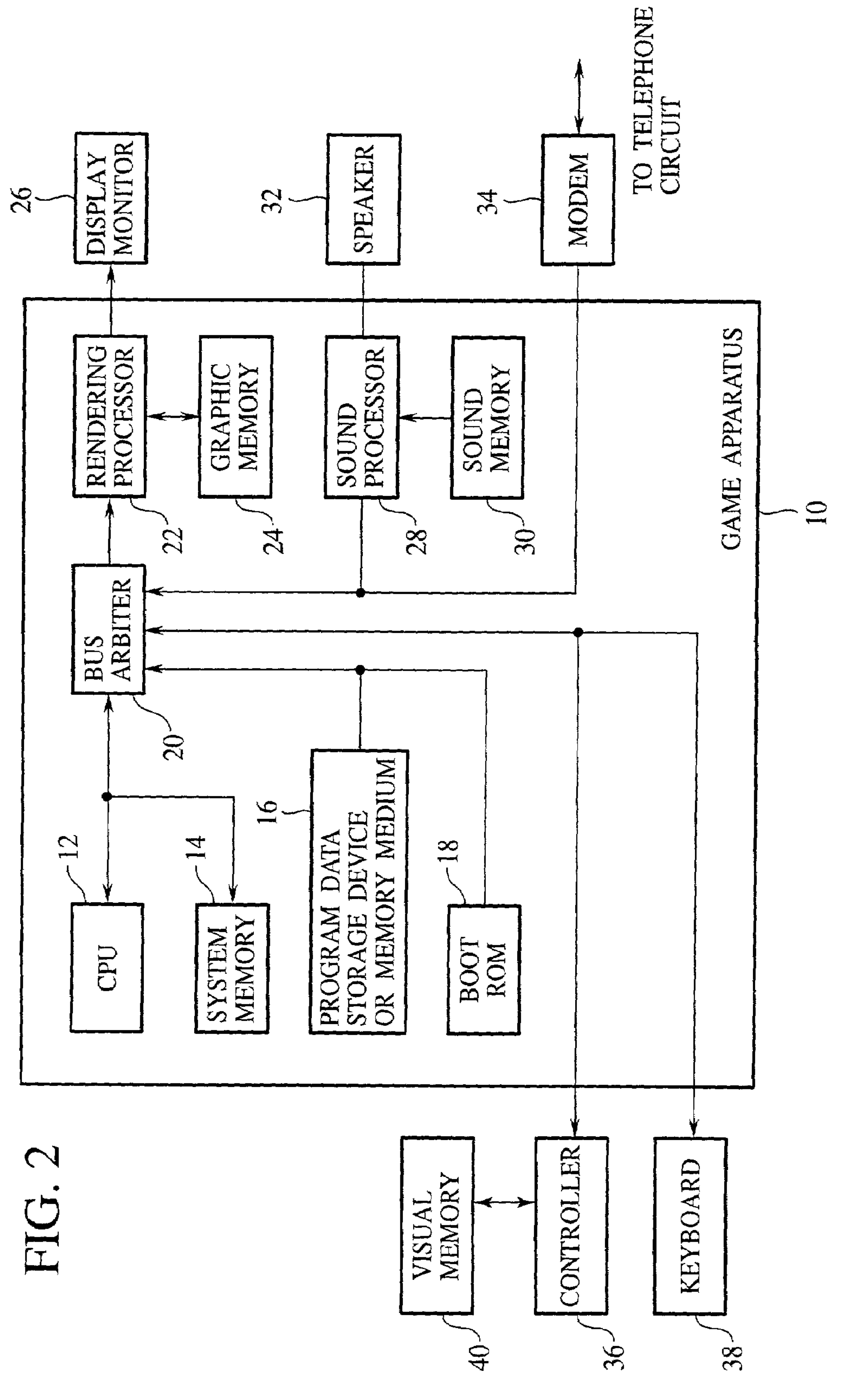
FIG. 2 is a block diagram of the game apparatuses of the network system according to the first embodiment of the present invention.

As shown in FIG. 2, in each game apparatus 10, a CPU 12 which makes coordinate computations, etc. for the execution of game programs, the general control and image display, and a system memory (RAM) 14 which is used as a buffer memory for storing programs and data for the processing by the CPU 12 are connected with a bus arbiter 20 by a common bus line. The bus arbiter 20 controls flows of programs and data related to respective blocks of the game apparatus 10 and outside devices connected with the game apparatus 10.

Furthermore, a program data storing device or a memory medium 16 (including optical disc drives for driving CD-ROMs, etc. as storage media for games, or optical discs) which stores the game programs and data (including image data and music data) and a BOOT ROM 18 which stores programs an data for actuating the game apparatus 10 are connected with the bus arbiter 10 by a bus line.

A rendering processor 22 which reproduces image (MOVIE) data red from the program data storage device or storage medium 16 or producing images to be displayed in accordance with operations of a game player or game progresses, and a graphic memory 24 which stores graphic data, etc. necessary for the image production by the rendering processor 22 are connected through the bus arbiter 20. An image signal outputted from the rendering processor 22 is converted from a digital signal to analog signal by a video DAC (not shown) to be displayed on a display monitor 26.

A sound processor 28 which reproduces music data read from the program data storage device or storage medium 16 or produces effect sounds and voices in accordance with operations by a game player and game progresses, a sound memory 30 which stores sound data, etc. necessary for the production of the effect sounds and voices of the sound processor 28 are connected through the bus arbiter 20. Sound signals outputted from the sound processor 28 are converted by an audio DAC (not shown) from digital signals to analog signals to be outputted from a speaker 32.

The bus arbiter 20 also has the function of an interface and is connected to outside communication circuits of telephone circuits, etc. through a MODEM 34. The MODEM 34 connects the game apparatus 10 to an internet through the telephone circuits, whereby the game apparatus can communicate with other game apparatuses or network servers, etc.

A controller 36 which outputs information for controlling devices connected with the game apparatus 10 and the outside in accordance with operations of a game player is connected with the arbiter 20.

The controller 45 is connected with a visual memory 40 having a display and operational buttons. Information intrinsic to a game player operating the game apparatus is stored in the visual memory 40.

The bus arbiter 20 is connected with a keyboard 38 which facilitate input of characters by an operator. An operator quickly input characters of chats, etc. by means of the keyboard 38. In place of connecting the keyboard 38 it is possible that a soft keyboard is displayed on the screen, and keys of the soft keyboard are selected by the controller 36 to selectively input characters.

The above-described MODEM 34 uses the telephone circuit, but other communication means, such as a cable MODEM using cable television circuits, wireless communication means using mobile telephone and PHS, optical fiber communication means using optical fibers may be used.

(Online Systematization Method)

An online systematization method for the network system according to the present invention will be explained with reference to FIG. 3.

Figure 3:
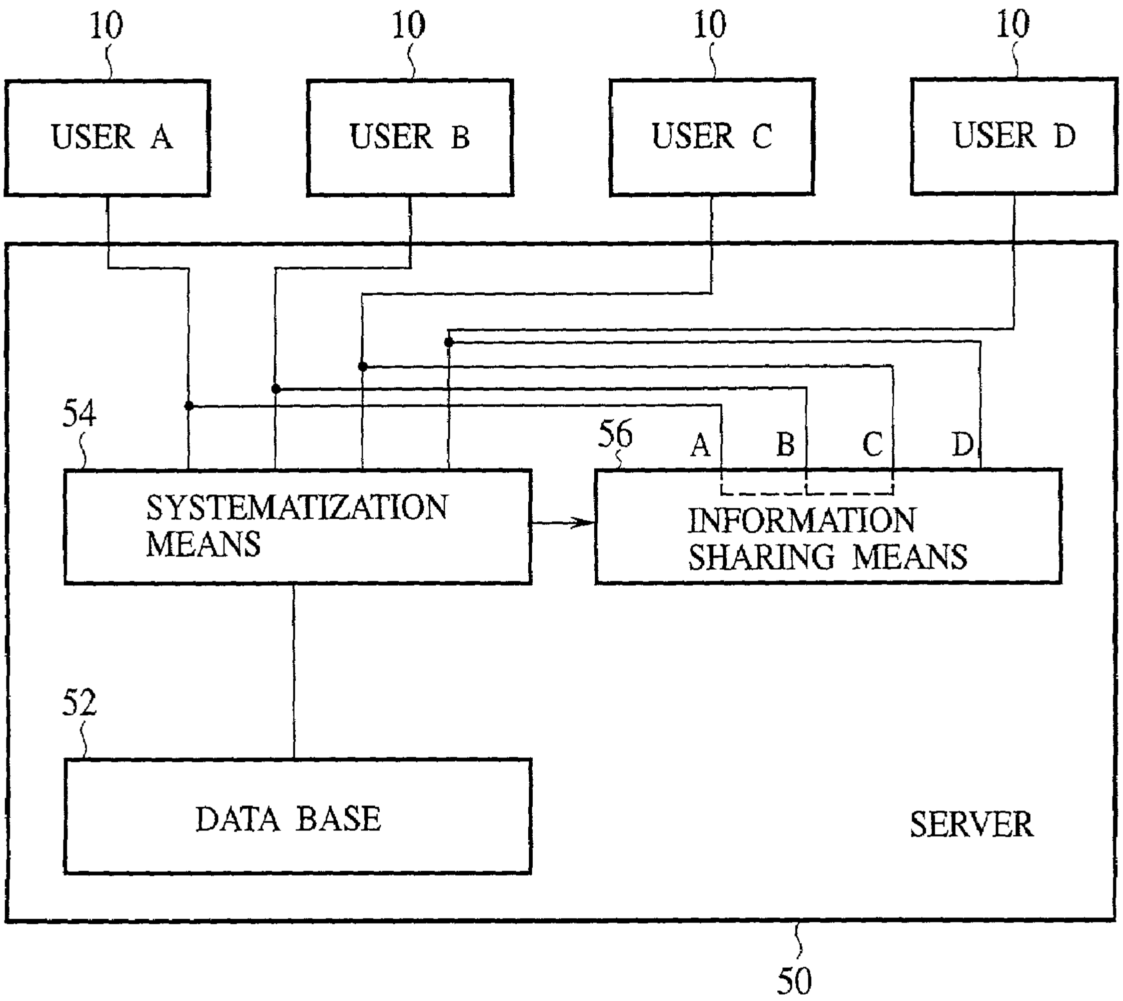
FIG. 3 is a view explaining the online systematization method of the network system according to the first embodiment of the present invention.

As shown in FIG. 3, the game apparatuses 10 of a number of users A, B, C, D, . . . are network-connected with the server 50. The server 50 obtains on line personal information of the respective users A, B, C, D, . . . from the game apparatuses 10 of the respective users A, B, C, D, . . . , and form a database 50 of the personal information.

As described above, the visual memories 40 as outside memory means are connected with the controllers 36 of the respective game apparatuses 10. The visual memories 40 store personal information of game players associated with the respective game apparatuses 10. When the game apparatuses 10 are connected with the server 10 through the communication circuit, the game apparatuses 10 transmits the personal information stored in the visual memories 40 to the server 50.

The systematization means 54 systematizes the users A, B, C, D, . . . online connected.

When a regular chat is made, the systematization means 54 prepares a plurality of chat rooms and systematizes users A, B, C who have made procedures for the participation in the chat room. The systematization means 54 informs the respective users A, B, C of their participation in the chat room while transmitting systematization information to the information sharing means 56. The information systematization 56 shares information of the game apparatuses 10 of the users A, B, C, and the systematization is completed.

When an online game is performed, compatible users are selected based on the personal information of the users A, B, C, D, . . . registered in the database 52 to be systematized. For example, the systematization means 54 tries to systematize the user A, the user B and the user D who are common in a purpose. The systematization means 54 informs the respective users A, B, C that they are compatible with one another while transmitting systematization information to the information sharing means 56. When the respective users A, B, C agree, the information sharing means 56 shares information of the game apparatuses 10 of the users A, B, C, and the systematization is completed.

When the game apparatuses 10 of the users A, B, C are completed, the information sharing means 56 transmits to the respective game apparatuses 10 control information for executing a specific task. In response to the control information, the respective game apparatuses 10 execute the specific task.

(Event Chat)

The event chat is a chat in which a specific event, for example, that objects (player characters, non-player characters (NPC), objects, backgrounds, etc.) in displays are changed, or a specific sound, music, etc. are produced takes place in response to a string of characters.

Correspondences between strings of characters which produce events and the events are prepared in a data table. A basic data table for event chat is stored in the program data storage devices or storage media 16, which are CD-ROMs for a game to be loaded in the game apparatuses 10. The server 50 stores renewal data table for amending or adding to the basic data table. When the game apparatuses 10 are actuated, the basic data table in the CD-ROMs 16 are developed in the system memories of the game apparatuses 10. When the game apparatuses 10 are connected with the server 50, the table in the system memories 14 are renewed to most recent data table by the renewal data table in the server 50.

The basic operation of the even chat is that, when one game apparatus 10 receives a chat character string from another user through the server 50, said one game apparatus 10 detects with reference to the data table in the system memory 14 whether or not the chat character string contains a string of characters which agrees with one of the strings of characters in the data table. When the chat character string contains am agreeable string of characters, said the game apparatus 10 execute an event set in the data table. The same control is made in all the game apparatuses 10 of the respective users participating in the chat room.

Figure 4:
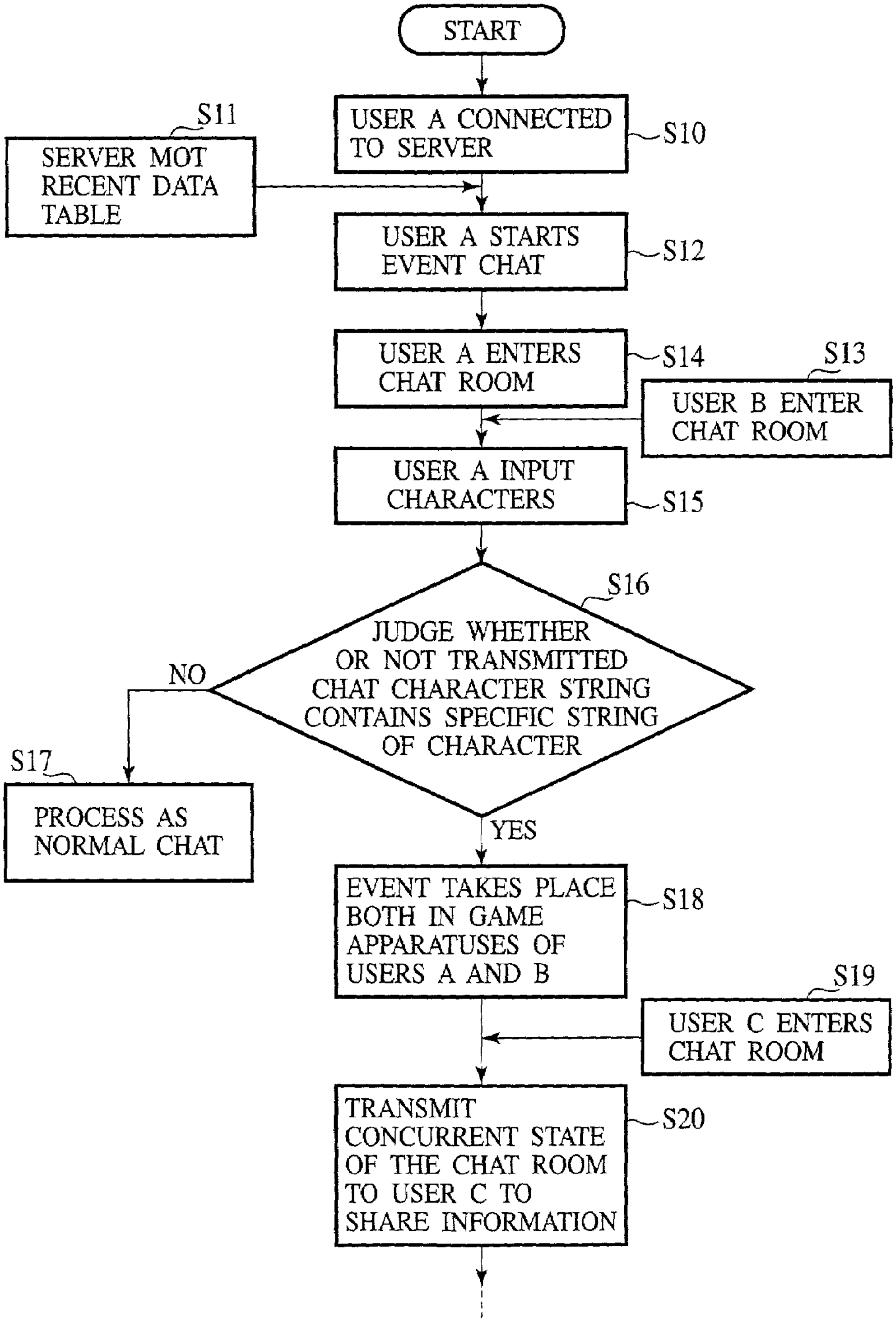
FIG. 4 is a flow chart of the control for the event chat of the network system according to the first embodiment of the present invention.

The control flow of the event chat will be explained with reference to FIG. 4.

When the user A loads a CD-ROM 16 for the event chat into the game apparatus 10, the event chat program is loaded into the system memory 14. At this time, a basic data table for the event chat is developed in the system memory 14. Next, the game apparatus 10 is connected with the server 50 through the internet 60 (Step S10). When the game apparatus 10 is connected to the server 50, a renewal data table for the event chat is transmitted from the server 50 (Step S11).

The user A starts the event chat (Step S12), and enters a chat room and waits for another user to enter the chat room (Step S13). When the user B enters the chat room the user A is in (Step S14), the chat is enabled between the users A and When the user A inputs a chat character string (Step S15), whether or not the input chat character string contains a specific string of characters is judged (Step S16). When the specific string of characters is contained, the chart character string is processed as a normal chat (Step S17). When the specific string of characters is contained, an event corresponding to the specific string of characters takes place between the game apparatus 10 of the user A and the game apparatus 10 of the user B (Step S18). Every time the user A and the user B input chat character strings and chat, Steps S15 to S18 are repeated to process the event chat.

Then, when another user C enters the chat room (Step S19) a concurrent state of the chat room is transmitted to the game apparatus 10 of the user C to share information of the user A and the user B (Step S20).

Then, the chat is made among the user A, the user B and the user C, and every time the users utter, the processing of the event chat is made. Every time the users enter or exit the chat room, the shared information is renewed.

(Examples of the Event Chat)

Examples of the event chat will be explained with reference to the drawings.

(A First Example)

A first example is shown in FIG. 5. In this example, when a chat character string contains a specific string of characters, the specific string of characters is detected, and all user characters participating in the chat are changed.

Figure 5A:
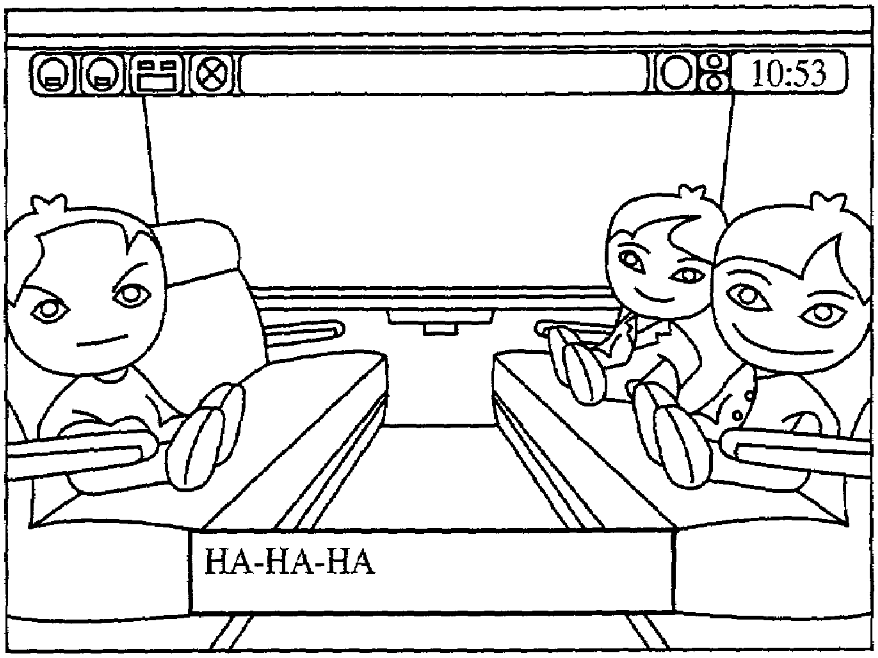
FIGS. 5A and 5B are views of a first example of the event chat of the network system according to the first embodiment of the present invention.

In a case that three users are in a chat room, as shown in FIG. 5A, three user characters are displayed in the chat room. When one of the users inputs a character string, the inputted character string is displayed on the screens of the respective users. When one user inputs a string of characters, the inputted string of characters is displayed on the screens of the respective users. Thus, the users exchange strings of characters to chat.

Figure 5B:
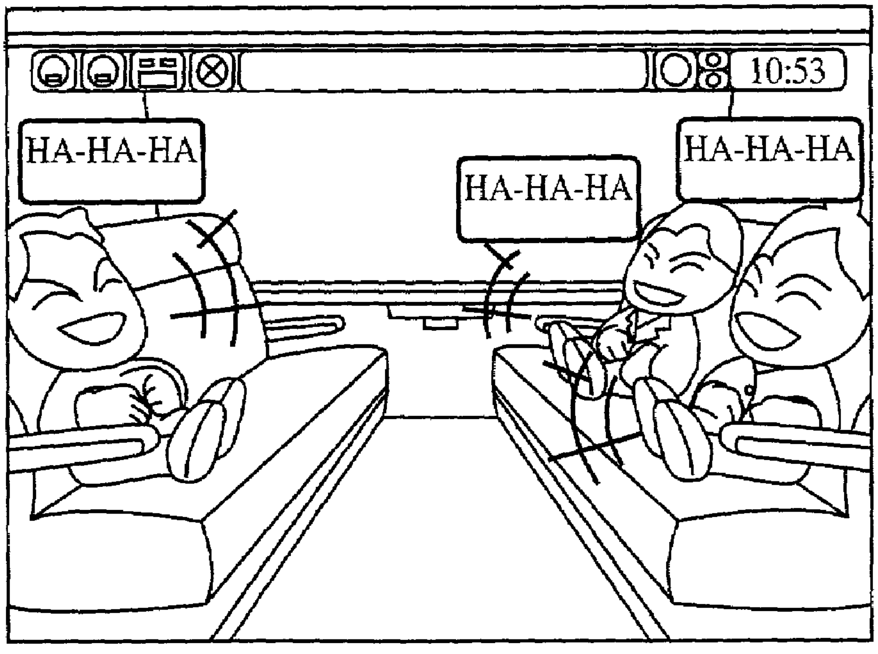

In a case that a character string inputted by one user contains a string of characters "ha-ha-ha", the game apparatuses 10 generates an event corresponding to the string of characters "ha-ha-ha", based on a data table developed in the system memories 14. In this example, as shown in FIG. 5B, all the user characters participating in the chat making laughter, uttering sounds of the laughter. The same control is made in the game apparatuses 10 of all the users participating in the chat.

In addition to the above-described example, in response to the string of characters "ha-ha-ha", all the other users except for the character of one game player may make laughter. Furthermore, a user character on which an event takes place may be commanded by using the string of characters "ha-ha-ha>B". Although the string of characters "ha-ha-ha" generates an event, the string of characters "Gha-ha-ha", for example, may generate no event. The detection of a string of characters may thus have certain conditions.

When a string of characters is inputted, motions of the user characters of the game players make, e.g., anger, laugh, cry, etc. and shapes of balloons can be commanded in addition of strings of characters. Not only inputted strings of characters, but also items of inputted motions and shapes of balloons are contained in a data table, whereby it may be judged whether or not to generate events also based on such inputted items.

(A Second Example)

A second example is shown in FIG. 6. In this example, when a specific string of characters is contained in a chat character string, the specific string of characters is detected to change a specific one of user characters participating in the chat.

Figure 6A:
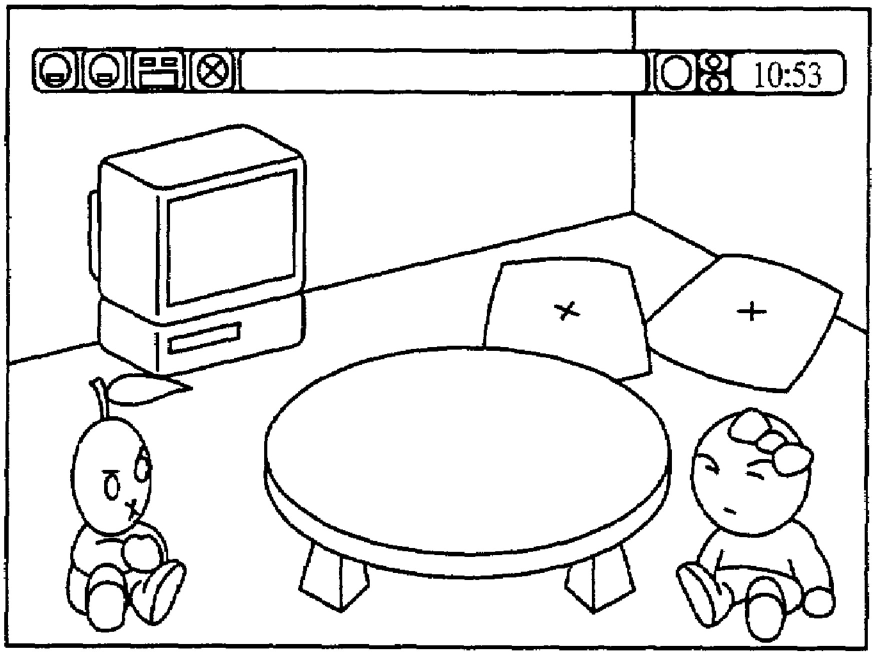
FIGS. 6A and 6B are views of a second example of the event chat of the network system according to the first embodiment of the present invention.
Figure 6B:
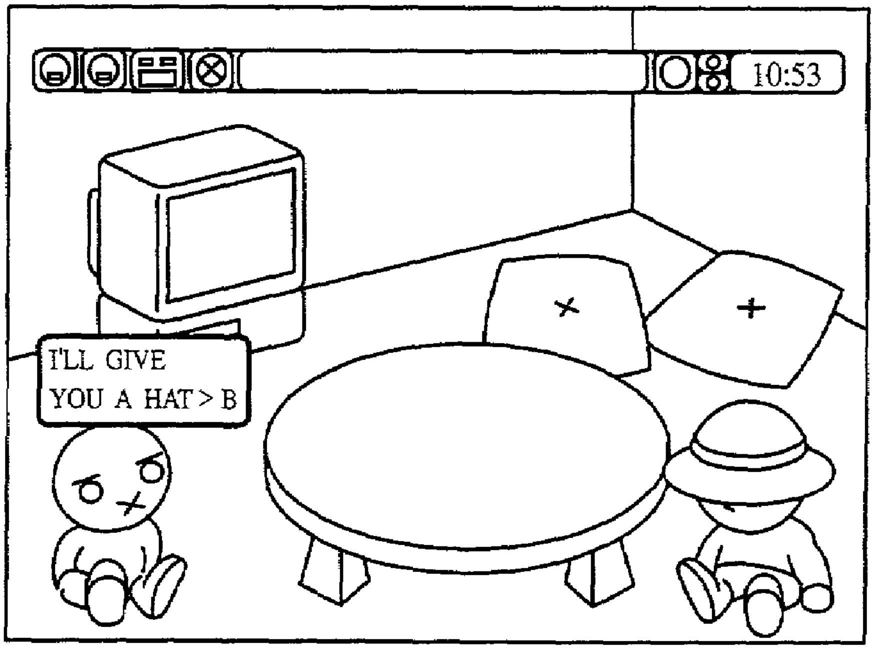

As shown in FIG. 6A, two users participate in a chat room. The user character on the right side has a ribbon. When the user character on the left side utters "I'll give you a hat>B", as shown in FIG. 6B, "I'll give you a hat>B" is displayed in the balloon of the user character on the left side, and the event that a hat is put on the user character on the right side of the handle name of "B" takes place.

In addition to this example, hats may be put on, without specifying user characters, all user characters other than the user character of one game player, and objects other than hats may be commanded and given.

(A Third Example)

Figure 7A:
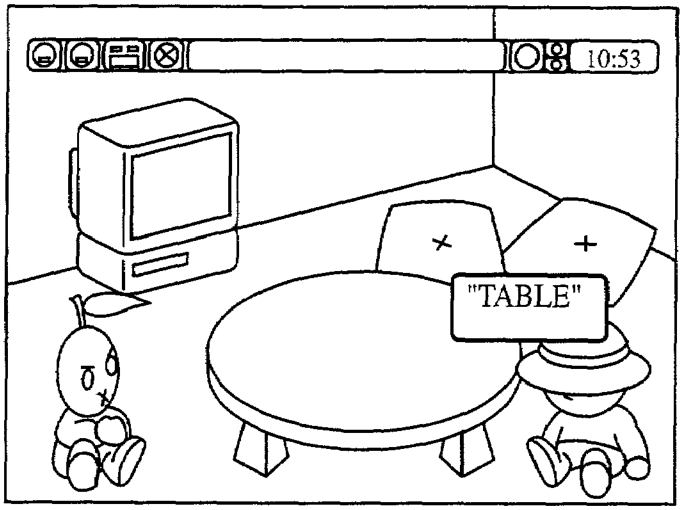
FIGS. 7A, 7B and 7G are views of a third example of the event chat of the network system according to the first embodiment of the present invention.
Figure 7B:
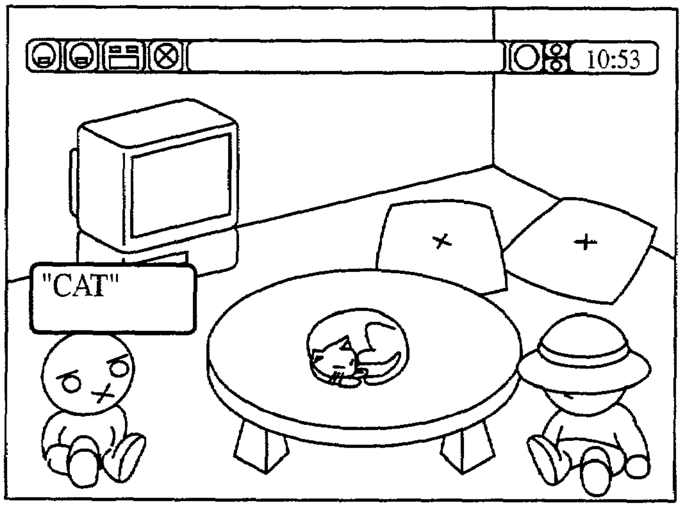
Figure 7C:
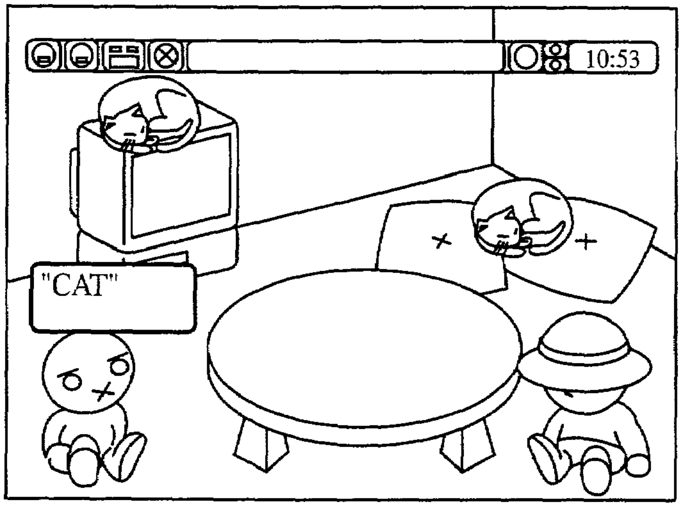

A third example is shown in FIG. 7. In this example, specific combinations of strings of characters contained in exchanged chat character strings are detected, and when the specific combinations are detected, specific events are generated.

As shown in FIG. 7A, two users take part in a chat room. When the user character on the left side utters "Table", as shown in FIG. 7A, "Table" is displayed in the balloon of the user character on the right side. Subsequently, when the user character on the left side utters "Cat", as shown in FIG. 8B, the event that “Cat” is displayed in the balloon of the user character on the left side, and a cat is displayed on the table at the center takes place.

As described above, in this example, combinations of strings of characters indicating positions, which has been uttered by one user, and of strings of characters indicating object to be positioned, which has been uttered by the other user can generate various events. As exemplified in FIG. 7C, the combination of “on the TV set” and “a cat” displays a cat on the TV set, and the combination of “at a corner of the room” and “a cat” displays a cat at a corner of the room.

In addition to the above-described example, it is possible that a user is indicated by “on a TV set>B”, “a cat>A” or others to let the user make the motion of placing the object.

(A Fourth Example)

A fourth example is shown in FIG. 8. In this example, when a specific string of characters is contained in a chat character string, the specific string of characters is detected to change a state of the chat room.

Figure 8A:
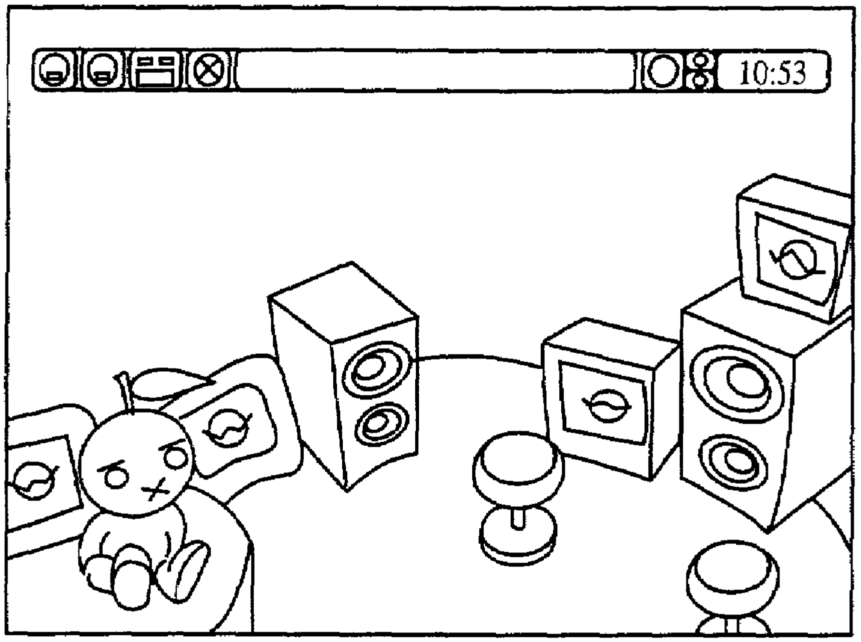
FIGS. 8A and 8B are views of a fourth example of the event chat of the network system according to the first embodiment of the present invention.
Figure 8B:
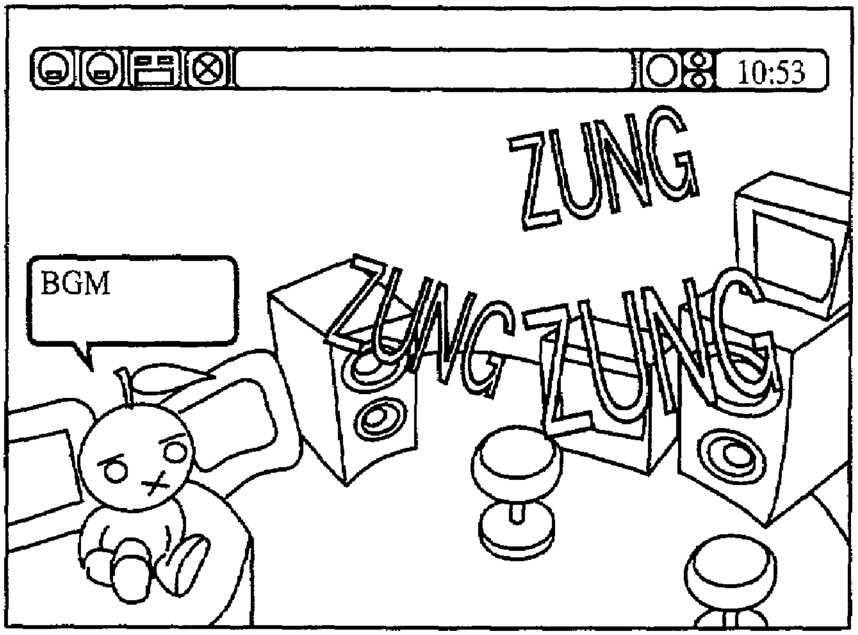

As shown in FIG. 8A, two users participate in a chat room with an acoustic equipment provided. No music is heard in the chat room. When the user character on the left side utters “BGM”, as shown in FIG. 8B, “BGM” is displayed in the balloon of the user character on the right side, and a tint of the general background of the chat room is changed, specific music is heard, and characters “ZUNG, ZUNG” are displayed on the screens corresponding to the music.

As described above, in this example, specific strings of characters are uttered, whereby specific events, as of giving forth music, etc., are generated. Depending on events, kinds of the chat room may be added to conditions for the events.

As exemplified in FIG. 8, in the case that the chat room has an acoustic equipment, the string of characters “BGM” is effective, but in the chat room without acoustic equipments as shown in FIGS. 6 and 7, even when “BGM” is uttered, no event is generated.

In the chat room of a box seat of a train shown in FIG. 5, it is possible that in response to a string of characters “MT. FUJI”, the Mt. Fuji is displayed on the window, and in response to a string of characters “TUNNEL”, noises of passing a tunnel are made.

(A Fifth Example)

A fifth example is shown in FIG. 9. In this example, specific control characters are contained in a chat character string, the specific control characters are detected to make prescribed processing.

Figure 9A:
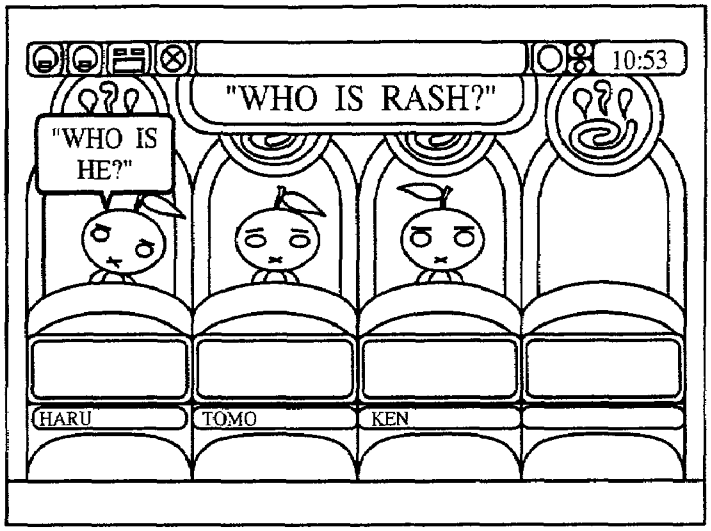
FIGS. 9A, 9B and 9C are views of a fifth example of the event chat of the network system according to the first embodiment of the present invention.

As shown in FIG. 9A, three users participate in a chat room for quizzes. A question “WHO IS RASH?” is displayed at upper parts of the screens. When the user of the character on the left side inputs “WHO IS HE?”, as shown in FIG. 9A, the utterance is displayed as a normal utterance in the balloon of the user character on the left side.

Figure 9B:
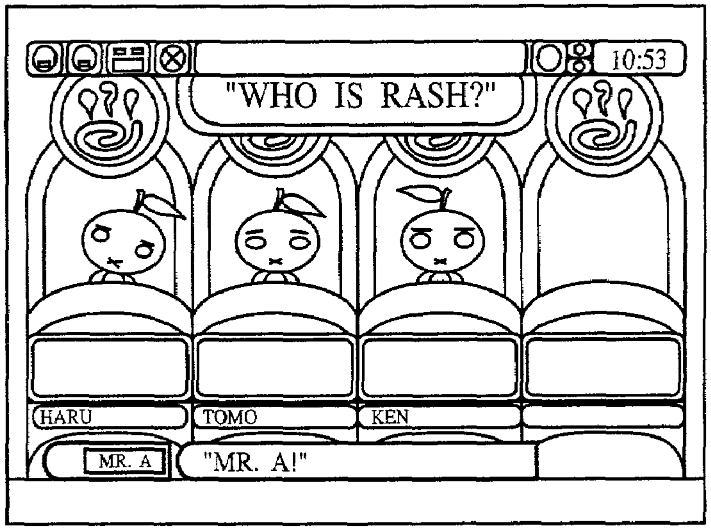
Figure 9C:
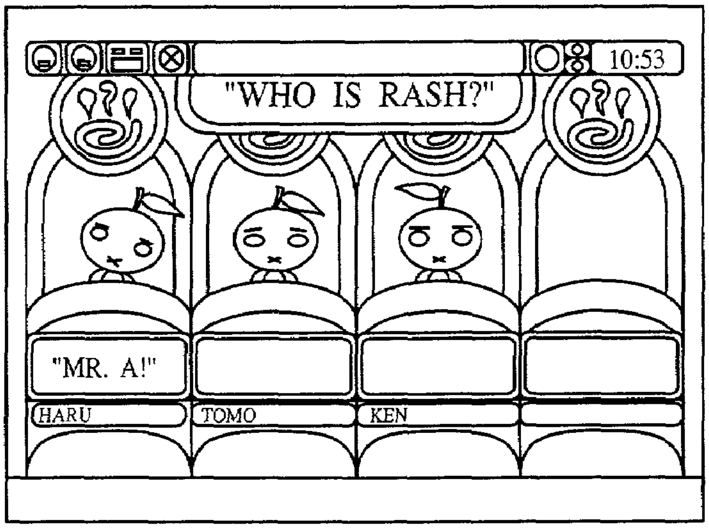

When the users answer, the users input answers in brackets 『』. When the user character on the left side inputs “『Mr. A!』”, as shown in FIG. 9B, “『Mr. A!』” is displayed at lower parts of the screens. The strings of character in the brackets 『』is judged as the answer, as shown in FIG. 9C, “Mr. A!” is displayed in the answer display area for the user character on the left side, at this time without the control character 『』omitted.

As described above, in this example, the specific control character is used to specify answers. In the same way, control characters may be used in inputting questions and themes for discussions. It is also possible that events to be generated are judged in consideration of kinds of chat rooms and concurrent states of chat rooms.

(Modifications)

In the preset embodiment, in addition to the above-described examples, various events may be generated on other various conditions.

The event chat is a chat which responses to specific strings of characters in chat character strings to generate specific events.

Chat character strings are displayed in a manner that a chat character string containing a specific string of characters is displayed as it is, a chat character string is subjected to a prescribed processing to be displayed, a chat character string is not displayed at all, or others. Chat character strings may be displayed to a specific user. The data table commands a manner for a chat character string to be displayed in.

In a case that specific events are events in which user characters are changed, which character to be changed can be indicated. It can be indicated, e.g., that all user characters are changed, a character of one user alone is changed, a character of one user alone is changed, a character of the other user is changed, an indicated character alone is changed.

A character may be changed depending on its concurrent position, e.g., whether the character is in a prescribed area, whether the character is away from a prescribed object by a prescribed distance, and whether the character is within a prescribed distance from a character of one user.

It is possible that a state of a character of a user can be indicated on the user s side, whereby when the character is in a busy state, i.e., engaged, is away from his desk or in other states, no response is made to an indication of a change, and no change is made.

Modes to which characters are changed express various feelings, such as joy, anger, sadness, etc.

In a case that specific events are event in which objects are changed, objects to be changed are structural thins of chat rooms, such as windows, doors, walls, etc., and objects placed in the chat rooms, such as dogs, cats, children, etc. As modes in which objects are changed, for example, objects appear or disappear, colors of objects are changed, positions of objects are changed, and shapes of objects are changed.

(Chat Sensor)

The chat sensor of the online system according to the present embodiment will be summarized.

The chat sensor is similar to the above-described event chat in that specific events are generated in response to specific strings of characters in chat character strings but is characterized by an online game played by a plurality of users forming a team. In the online game, a plurality of users form a team and advance a game while communicating with one another through chats. In response to chats in the team, specific events are generated.

The present embodiment exemplifies online games, but what are played by a team of a plurality of users are not limited to games and can be any kind of tasks, such as operations, duties, etc., as of works, studies, etc.

The online game includes, e.g., map information for deciding an layout of passages, doors, obstacles, etc. in a region to be explored, and script information for deciding a scenario of the exploration. The chat sensor generates events corresponding to such map information and script information in response to specific strings of characters in chat character strings.

To give instances, when a play inputs “OPEN SESAME!”, a door is opened; when “WHAT ARE YOU?”

is inputted near a person which is a non-player character (NPC), information corresponding to the contents can be available.

The chat sensor is also characterized in that responses can be made not only with respect to chats inputted by users own chats but also with respect to chats inputted by the other users. The use of chats permits messages inputted by one user to be seen not only by himself but also by the other users of a team. For example, it is possible that all the members of a team input "WHAT IS THE PASSWORD OF THIS DOOR?" in a chat to thereby find the password.

(Examples of Chat Sensor)

Figure 10:
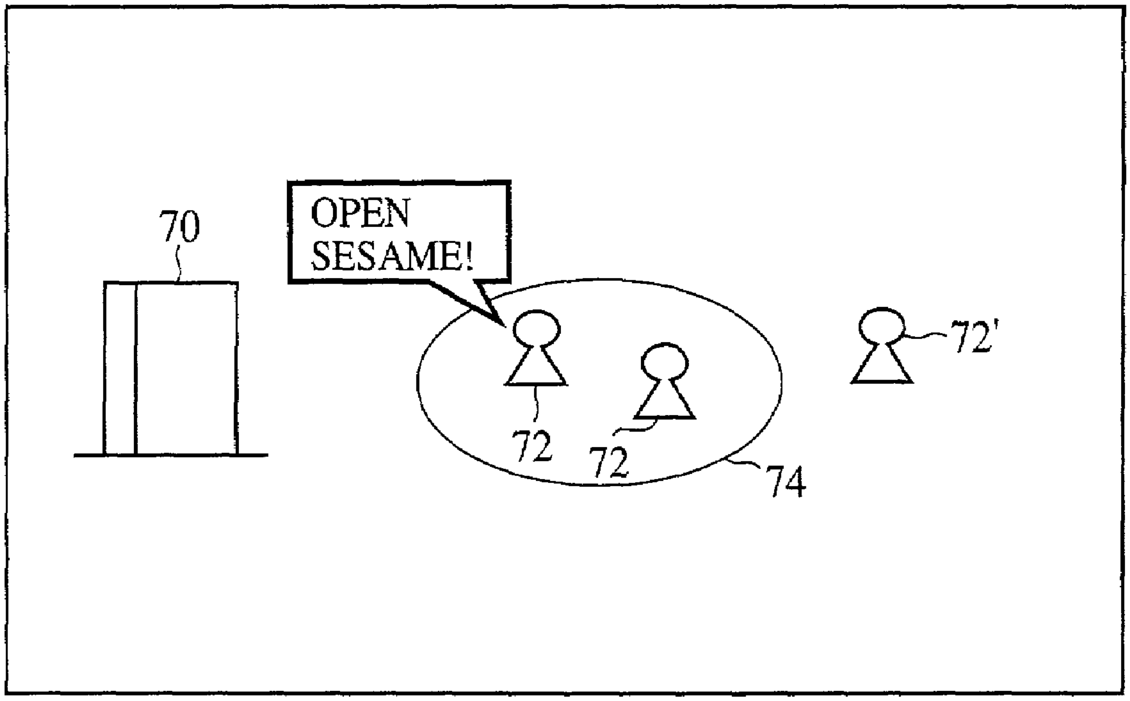
FIG. 10 is a view explaining a chat sensor of the network system according to the first embodiment of the present invention.

Next, the flow of the processing of the chat sensor will be summarized with reference to FIG. 10. The processing will be explained by means of an example of the chat sensor in which a door is opened in response to the key word OPEN SESAME!

As shown in FIG. 10, in a game region there is provided a door 70 to the next game region. User characters 72 enter the game region and chat, and their chats contain a specific string of characters, whereby the door 70 is opened.

First, the user characters 72 enter an indicated region 74 of the door 70 decided by the map information and input a chat character string. When the chat character string contains the specific string of characters OPEN SESAME!", A SWITCH id OF THE DOOR 70 IS TURNED ON. The switch ID of the door 70 is turned on, whereby the key of the door 70 indicated by the switch ID is opened. When a user character 72' outside the indicated region 74 inputs the specific string of characters "OPEN SESAME!", ineffectively the key of door 70 is not opened.

Basic information of specific strings of characters and events is read from CD-ROMs as in the event chat, but information relating the specific strings of characters to the events is incorporated in the script information, whereby the related information can be read at the same time that the script information is read from the server at the time of initiating the online game.

It is possible that as specific strings of characters, a plurality of key words are set, and responses are made to the key words. To be specific, when either of "OPEN SESAME!", "OPEN THE DOOR!", and "OPEN THE PASSAGE!" is inputted, the same response of opening the door is indicated.

For example, in a case that a key word is "BENTO!" (BOX LUNCH), it is possible that the string of characters with a usual affix or suffix, or the like added to, e.g., "O-BENTO!" (sophisticated form of BENTO (BOX LUNCH) can be responded to.

In the online game played by a team of users, it is possible that unless all the users of the team utter the specific string of characters "OPEN SESAME!", the door is not opened.

It is possible that a key word is divided, and unless all users of a tem substantially simultaneously input the respective divided strings of characters, the door is not opened. For example, the door may be opened only when four divided strings of characters "O", "PEN", "SESA" and "ME" are respectively inputted.

As objects responsive to chats, in addition to the above-described door, objects, such as passages, NPC, etc. may be opened, and scenarios may be developed. It is possible that strings of characters in chat character strings exchanged in a game among the users of a team influence the development of a scenario, and chat character strings must be deliberately uttered, which makes the game deep.

(The Chat Sensor in Quests)

The chat sensor in quests of the network system according to the present embodiment will be explained.

The quests are like short stories which advance in accordance with users own scenarios. The quests widely range from short ones that take about 10 minutes of game time to long ones that takes some hours of game time. The quests have relatively small volumes and are downloaded suitably from the server.

The table containing strings of characters responsive to the chat sensor are contained in a script file of the quests. Locations of the script file varies depending on kinds of the quests. The quests are largely divided in two kinds, and the locations of the respective script files are different from each other.

While an online game is being played, the table is present in the system memory 14 of the game apparatus 10. The table in the system memory 14 is referred to as required.

The quests comprises online quests and download quests. The online quests are initially stored in the server 50 and transmitted to the game apparatuses 10 as required. The download quests are normally stored in the visual memory 40 and inputted to the tame apparatuses 10 as required. The download quests are downloaded from the server 50 to the visual memory 40 when on line and can be read from the visual memory 40 to the game apparatuses 10 as required.

The online quests and the download quests can contain specific strings of characters necessary for the chat sensor, which permits various tables to be virtually infinitely formed.

(Examples of the Chat Sensor in Quests)

Examples of the chat sensor in quests will be explained. For example, in response to a specific string of characters in chat character string, a non-play character (NPC) makes a response. A non-player character (NPC) gives necessary information in response to a specific string of characters, and his response increases sensitivity of his user character.

Non-player characters (NPCs) and objects can be moved by chats. For example, strings of characters, e.g., "FORWARD", "WALK", "STOP", "FIGHT", etc. are detected to let non-player characters and objects make motions in accordance with the detected strings of characters.

It is possible that set strings of characters are uttered in the chat sensor, penalties are given. For example, in chats, when utterances containing "DAMAGED", "DIMINISHED", "DIE", etc. are made, penalties, such as retreat, point decrease, etc. are given.

It is possible that depending on chat, a user character of one user, other user characters and NPCs can express their feelings. For example, in chats, when "ANGRY" is uttered, fire flames appear, and heart marks appear when "LOVE" is uttered.

It is also possible to influence the other user characters other than one user character in chats. For example, the other user characters are revived, are made immobile for a certain period of time, are made incapable of using magic, and are killed.

It is also possible that objects, such as specific objects, etc. can appear in accordance with set strings of characters in the chat sensor. For example, NPCs, enemies, doors, extra stages, etc. can appear in response to specific strings of characters.

(Tombs of Characters)

Tombs of characters of the online system of the present embodiment will be explained.

In the present embodiment, a character fights with enemies, etc. in an online game and dies, a tombstone of the character is erected to store information at the time of its death. When the character again comes to the place, the information at the time of the death is displayed. The other users of a team the user belongs to can see the information of the tomb.

Figure 11:
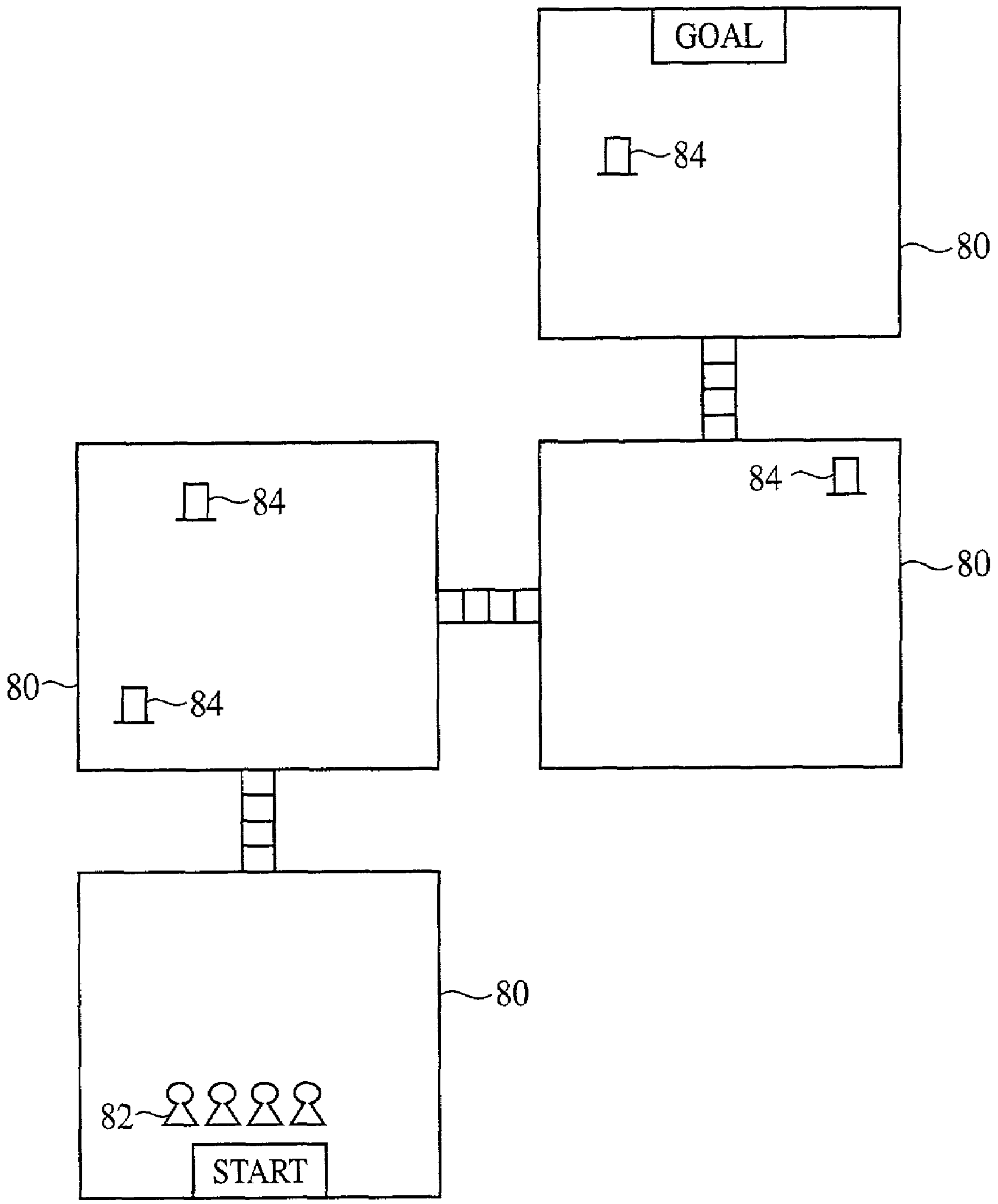
FIG. 11 is a view explaining tombs of characters of the network system according to the first embodiment of the present invention.

As shown in FIG. 11, the online game passes many game regions 80 from a start point to a goat point. A team of a plurality of user characters advances to the goal, fighting with enemies, etc. in a game region 80.

When a character dies in the fight with the enemies, etc. in the advance of the online game, a tombstone 84 is erected at a place of the death to store information at the time of the death. The information at the time of the death includes, for example, a name of the dead character, a time of the death, a name of the team, a name of an enemy, a final utterance of the character, etc. The information is stored in the visual memory 40 via the system memory 14 of the game apparatus 10.

Figure 12:
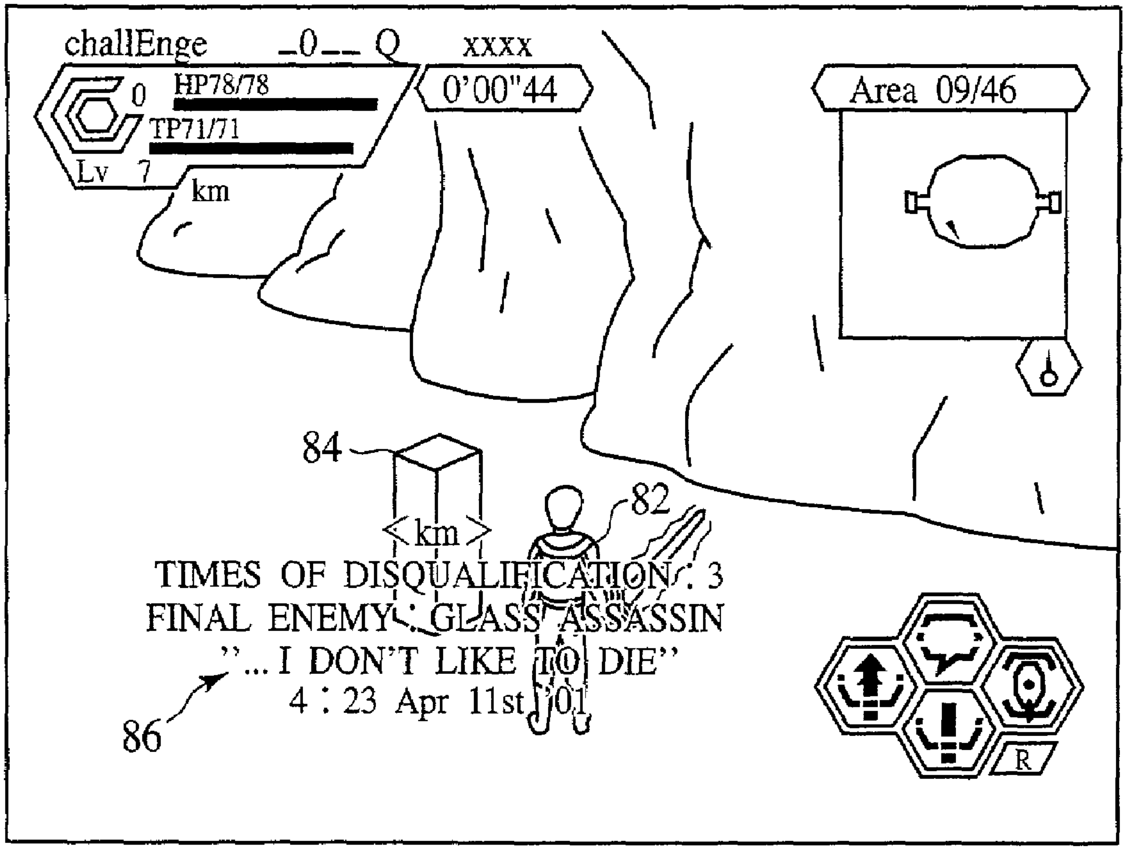
FIG. 12 is a view explaining tombs of characters of the network system according to the first embodiment of the present invention.

In a case that users who have once died play the online game in a team, when the users reach the points of their death, as shown in FIG. 12, the tombstones 84 appear to display their information 86 at the time of their death, e.g., times of disqualification, names of enemies they fought with, their final utterances, time of their death, etc. All the users of a team share information including information of the users at the time of their death, so that the other users other than the users who have once died can see the tombstones 84 and information 86 of the latter at the time of their death.

The tombstones 84 and the information 86 at the time of their death are shared by all the users of a team playing the game. Accordingly, users who were not in the same team at the time of their death take part in the team and can see the tombstones 84 and information 86 at the time of their death. When users who were in the same team at the time of their death take part in another team, they cannot see the tombstones 84 and information 86 at the time of their death.

In the proceeding of the online game, the users can confirm points of their own death or can confirm information of the other users of a team they take part in, which makes it more interesting to play the online game.

In an online game of the challenge mode, even when only one of the users of a team dies, all the users of the team must resume the game. In such online game, the individual users of the team can be alert in advancing the online game, utilizing the information of the tombstones.

(History of Items)

The temporal data function of items in the online system according to the present embodiment will be explained below.

In an online game, items (tools), such as weapons, protectors, etc., are bought/sold in a tool dealer and exchanged among users. In the present embodiment, as the history function of the items, the items which are exchanged independently of the game, are accompanied by their temporal information.

Figure 13A:
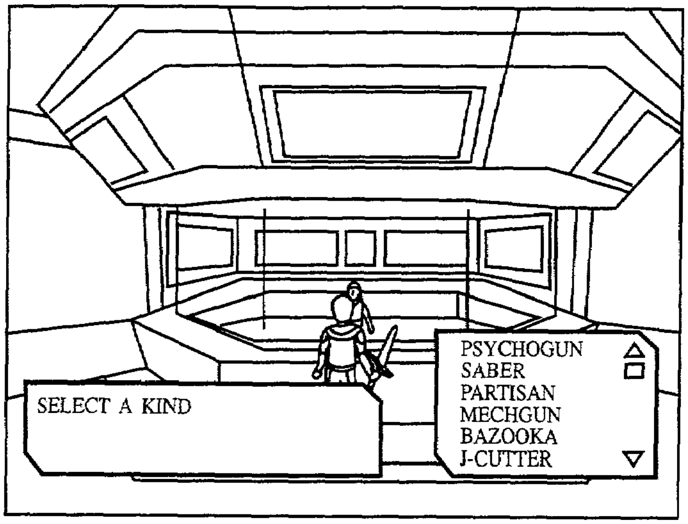
FIGS. 13A, 13B and 13C are views explaining a history of an item used in the network system according to the first embodiment of the present invention.
Figure 13B:
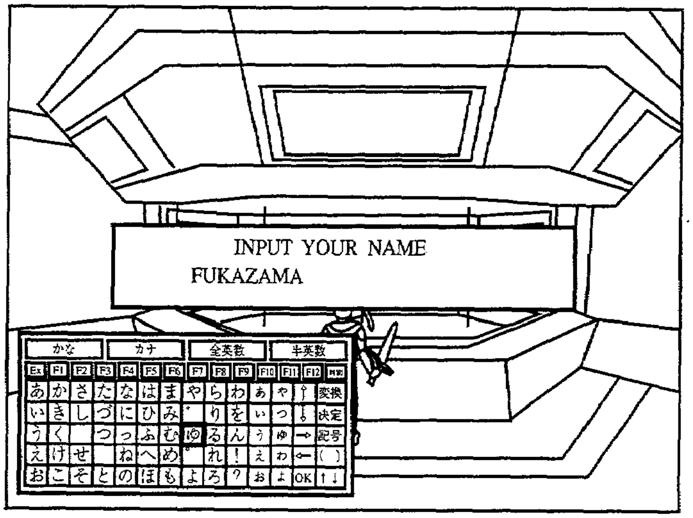
Figure 13C:
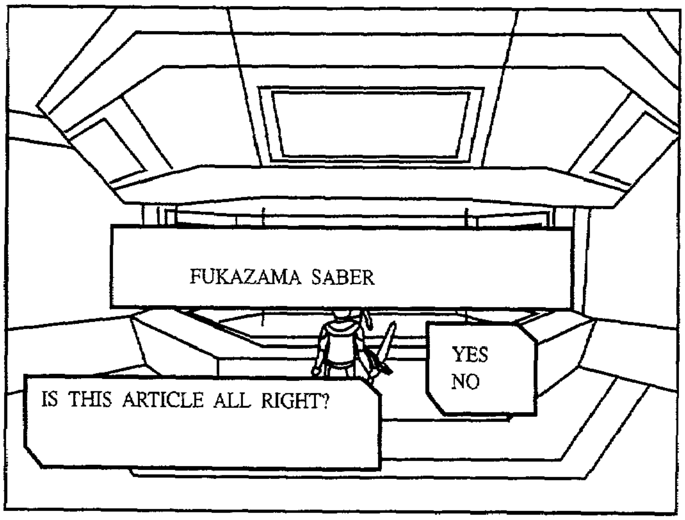

As shown in FIG. 13, when a user buys an item, he can register his name in the item. When the user buys an item in the tool dealer, first he selects a kind of the item; in FIG. 13A, he selects "SABER". Next, he user inputs his name to be applied to the item, by means of a soft keyboard; in FIG. 13B, "FUKAZAWA" is inputted. Then, the name "FUKAZAWA" is applied to the item "SABER". Then, the final confirmation as shown in FIG. 13C is made, and the buy is made.

When the user plays the online game, using the item "FUKAZAWA SABER", a record of the fight at the time is added as history information. Various history information is thus added to the item, and the item becomes an original item with names of the users who have owned the item, periods of time during which the users have owned the item, numbers of names of enemies the users have defeated, times of uses, etc. added to.

The history information of the item is stored in the visual memory 40 via the system memory 14 of the game apparatus 10 of the user owning the item. When an item is owned by the item dealer, the history information of the item is stored in the server.

History information can be added to the items, which gives a pleasure of forming the items original. The items can be bought and sold in the item dealer and can be exchanged among the users, which gives a pleasure of spreading over the internet the information of traditional items and of presence of items named by public figures, the information who has owned, and other information.

To give items scarcity value it is possible that nameless items a user can name cannot be owned unless the user reaches a certain level.

(World Ranking)

The world ranking function of the online system according to the present embodiment will be explained.

The world ranking function is a function that in the advance of the online game, game data is transferred by operating one button from the game apparatuses 10 to the server 50 so that the game data can reflect ranking results. Then, added results are downloaded. In the advance of the online game, the game apparatuses 10 are connected to the server 50 without influencing the advance of the one online game to download and upload data.

Figure 14:
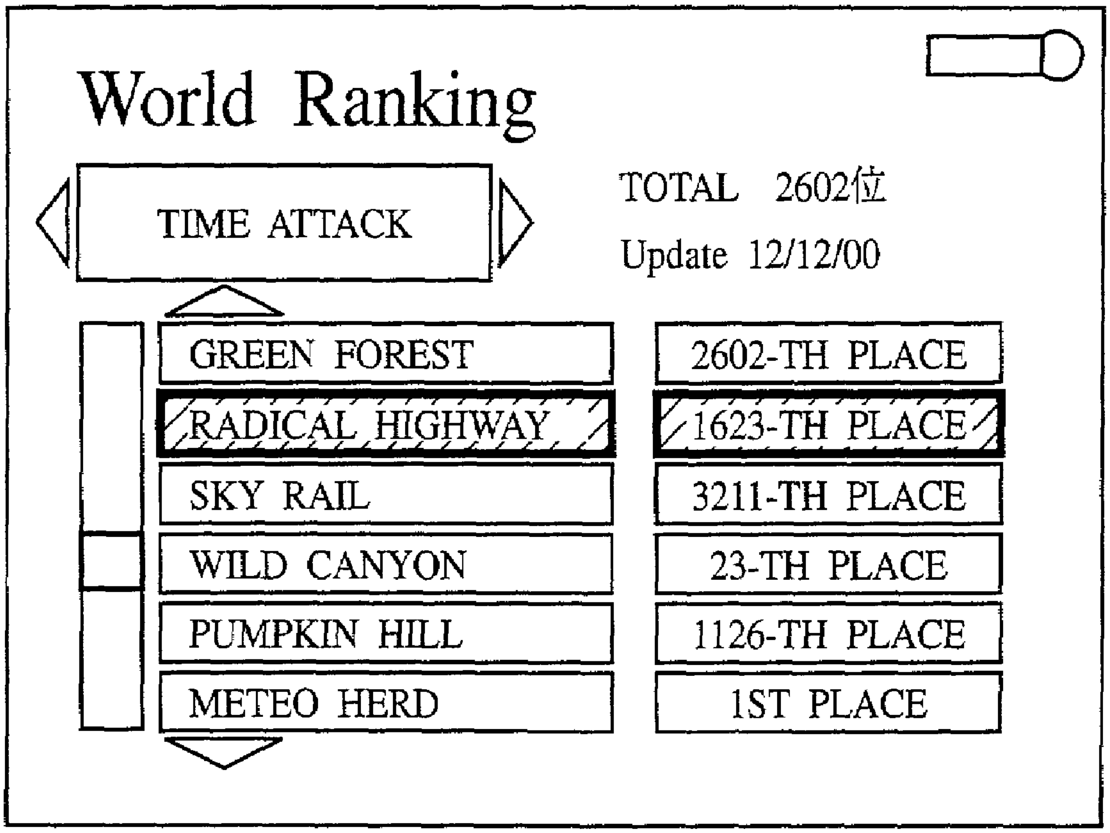
FIG. 14 is a view explaining the world ranking of the network system according to the first embodiment of the present invention.

In the advance of the online game, when a world ranking is selected from the submenus, data of the visual memories 40 of the game apparatuses 10 of the users is uploaded to the server 50, and the server 50 downloads most recent data. The most recent data are, for example, a shortest clear time, a highest score, numbers of emblems, owned periods of time, etc. Resultantly, the world ranking as shown in FIG. 14 is displayed on the screen. Information of ranking of each stage, etc. is displayed together with dates of uploads. When a stage is selected, detailed information for the state is displayed.

It is possible that when data is downloaded from the server 50, commercial information is downloaded to display commercials are displayed on the game screens. The commercials can bring additional earnings. Downloaded data may reflect the advance of the online game, as required.

(Character Input Assist System)

The character input assist system of the present embodiment will be explained.

(Character Input Assist System for Software Keyboard)

Considering that the controller 36 alone is connected to the game apparatuses 10, the present embodiment includes the software keyboard. The software keyboard is a keyboard, as shown in FIG. 15A, having a keyboard 100 displayed on the screen, which permits characters to be inputted by clicking the keys or operational inputs of the keys.

On the software keyboard, the cursor on the screen is moved by the controller 36 to be positioned on a character to be inputted, and a selection operations is made there to input the character. In inputting the dull sounds or the p-sounds, very inconveniently a dull sound sign or a p-sound sign must be selected after a character has been selected. However, the character input assist system of the present embodiment assists the inconvenient character input so as to make the character input easier.

Figure 15A:
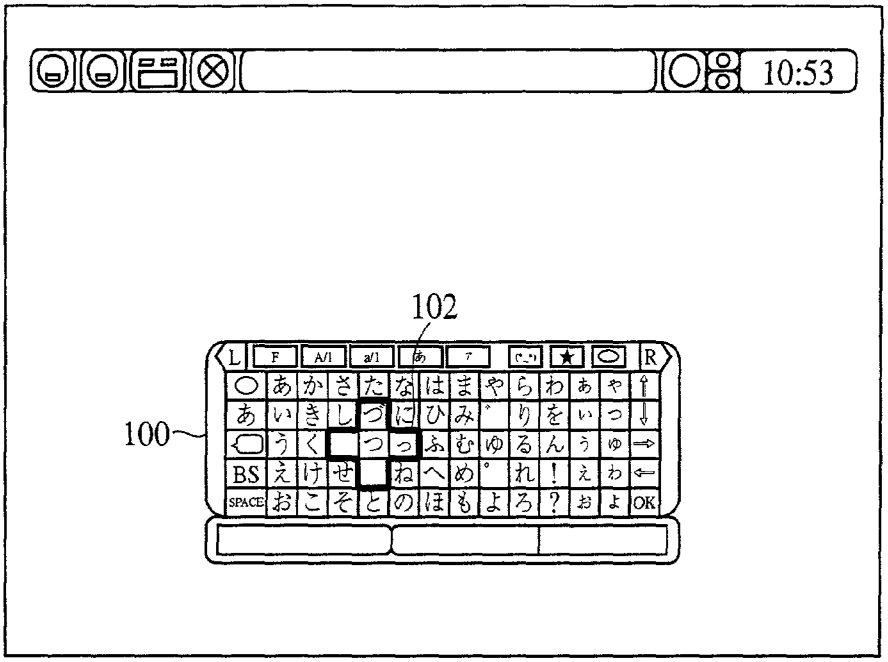
FIGS. 15A though 15L are views explaining the character input assist system for the software keyboard of the first embodiment of the present invention.
Figure 15B:
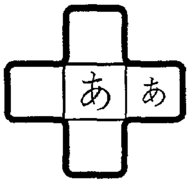
Figure 15C:
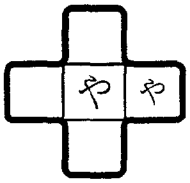
Figure 15D:
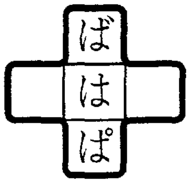
Figure 15E:
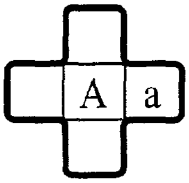
Figure 15F:
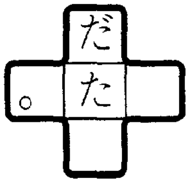
Figure 15G:
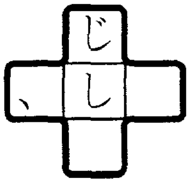
Figure 15H:
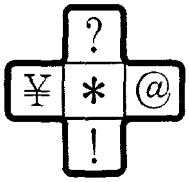

In the character input assist system of the present embodiment, in order to select a character, when the cursor is positioned on the selected character, as shown in FIG. 15A, a window 102 in the shape of a cross centering the selected character is displayed. The selected character “つ” (TSU of Hiragana) is displayed at the center of the window 102. Around the character “つ” (TSU of Hiragana), characters “づ” (ZU, a dull sound corresponding to TSU of Hiragana), “っ” (a small size of TSU of Hiragana) associated with the selected character are displayed. When the selected character “つ” (TSU of Hiragana) is inputted, the selection is made with moving the cursor. When the associated character “づ” (ZU, a dull sound corresponding to TSU of Hiragana), “っ” (a small size of TSU of Hiragana) is to be inputted, the cursor is moved to make the selection. Even in inputting associated characters, the cursor may be simply moved. The character input can be efficient.

An example of the operation by using the controller will be explained. First, by using the direction key, the cursor is brought into agreement with a selected character, and a button (e.g., Button A) is pressed. An image 102 copying the direction key is displayed on the screen, centering the selected character and overlapping the image 102. With the Button A pressed down, an associated character is selected by using the direction key, and the Button A is released. And the character is selected. When the selected character is inputted, the Button A is only released without operating the direction key. This operation is the same as the operation of the conventional software key board, which ensures compatibility with the conventional operation. Accordingly, the operation can be made without confusion.

The associated characters displayed around a window 102 can be, as described above, the dull sounds, p-sounds, different size characters, such as small characters, half size characters, twice size characters, etc., katakana, short consonants, long consonants, such as “きゃ” (KYA of Hiragana), “きゅ” (KYU of Hiragana), “きょ“(KYO of Hiragana), etc., punctuation marks, such as “。”, “、”, etc. Marks, such as “ ” (SPACE), “@”, “¥”, etc., Chinese characters, such as “年” (YEAR), “月” (MONTH), “日” (DAY), etc., idiomatic character strings, such as “こんにちは” (Good Afternoon), “よろしく” (Best regards), “さよなら” (Bye), etc., can be the associated characters.

It is preferable to set a rule for arranging the associated characters. For example, the sonants are upper, the p-sonants are below, and the small letters are right. Such ruling makes the input quicker.

Example of the window 102 are shown in FIGS. 15B to 15I. In the window shown in FIG. 15B, the selected character is at the center is “あ” (A of Hiragana), and “ぁ” (a small size of A of Hiragana) is right. In the window shown in FIG. 15C, the selected character at the center is “や” (YA of Hiragana), and “ゃ” (a small size of YA of Hiragana) is right. In the window shown in FIG. 15D, the selected character “は” (HA of Hiragana) is at the center, “ば” (BA, a dull sound of HA of Hiragana) is upper, and “ぱ” (PA, a p-sonant of HA of Hiragana) is below. In the window shown in FIG. 15E, a selected character A is at the center, and a small character a is right. In the window shown in FIG. 15F, a selection character “た” (TA of Hiragana) is at the center, “だ” (DA, a dull sound of TA of Hiragana) is upper, and “。” (a period of Hiragana) is left. This is in consideration that “た” (TA of Hiragana) is frequently followed by “。” (a period of Hiragana). In the window shown in FIG. 15G, a selected character “し” (SHI of Hiragana) is at the center, “じ” (JI, a dull sound of SHI of Hiragana) is upper, and “、” (a punctuation mark of Hiragana) is left. This is in consideration that “し” (SHI of Hiragana) is frequently followed by “、” (a punctuation mark of Hiragana). In the window shown in FIG. 15H, a selection character “*” is at the center, a character “?” is upper, “!” is below, and “¥” is left, and “@” is right. Frequently used marks are collected here. In the window shown in FIG. 15I, a selected character “年” (YEAR) is at the center, a character “月” (MONTH) is upper, a character “時” (TIME) is below, a character “日” (DAY) is left, and a character “分” (MINUTE) is right. Frequently used characters are collected here.

Figure 15I:
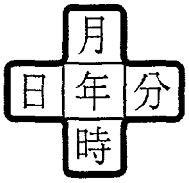
Figure 15J:
Figure 15K:
Figure 15L:
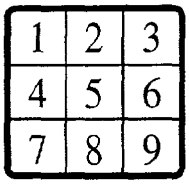

In the above-described examples, the cross-shaped windows 102 are used. However, as shown in FIG. 15J, a window displaying associated characters vertically arranged may be used. As shown in FIG. 15K, a window displaying associated characters arranged only horizontally may be used. As shown in FIG. 15I, a window displaying associated characters arranged in 8 directions may be used.

(Character Input Assist System for used in Mobile Terminal)

The character input assist system of the present embodiment is applicable not only to software keyboards, but also to mobile terminals such as mobile telephones, PHS, PDA, etc.

The character input assist system for use in mobile telephones will be explained with reference to FIG. 16.

The character input in the mobile telephones (including PHSs) is made by allocating one figure button to each columns of the Japanese syllabary and repeatedly pressing the same figure button to replace a character to be selected. For example, a Figure Button “1” is allocated to the characters of the A column. When the Figure Button “1” is pressed, first A is selected, and the Figure Button “1” is repeatedly pressed, whereby the characters are replaced in the sequence of “あ→い→う→え→お→ぁ→ぃ→ぅ→ぇ→ぉ→あ→ . . . ” (A→I→U→E→O→a→i→u→e→o→A→ . . . of Hiragana).

Figure 16A:
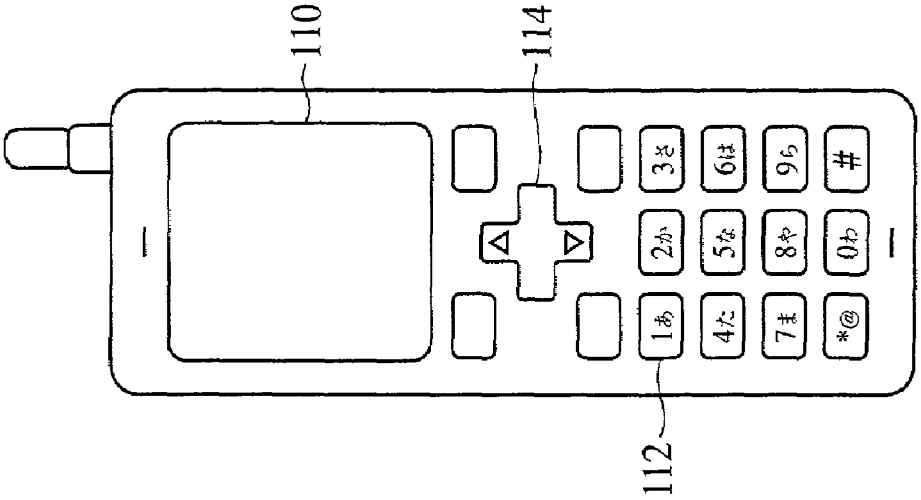
FIGS. 16A, 16B and 16C are views explaining the character input assist system of the first embodiment for use in the mobile telephones.
Figure 16B:
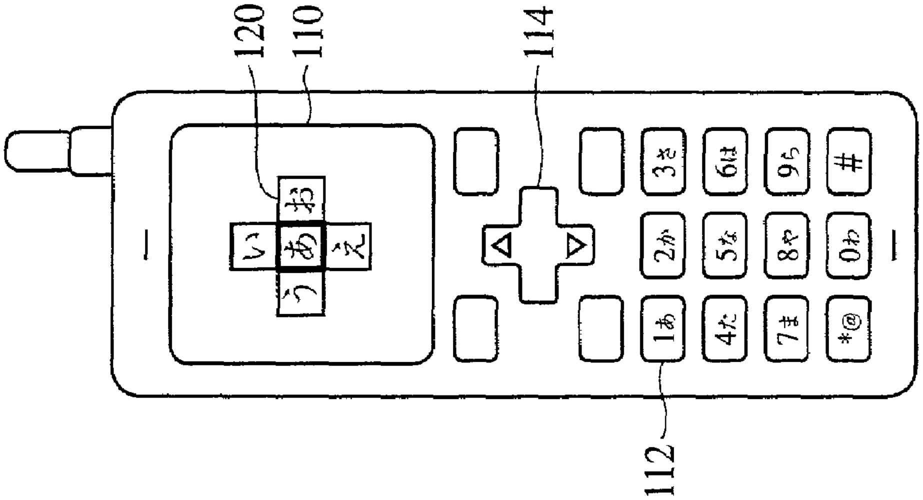
Figure 16C:
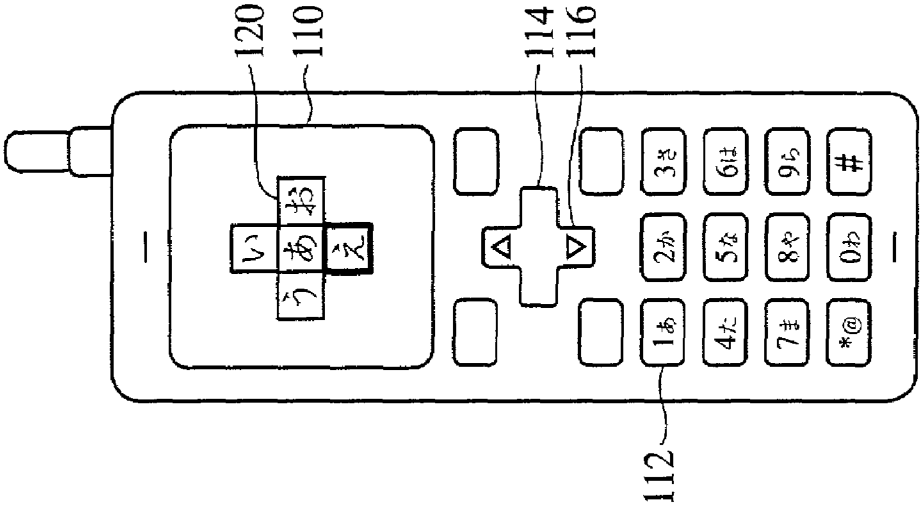

In order to simplify such disturbing character input of the mobile telephones, in the present embodiment, as shown in FIG. 16, when a figure button is pressed and then is continuously pressed, the cross-shaped window is displayed on the screen, and the associated characters are displayed in the cross-shaped window. A character is selected out of the associated characters by using the direction key.

First, as shown in FIG. 16A, the button “1あ” 112 is continuously pressed, as shown in FIG. 16B, the cross-shaped window 120 is displayed on the screen 110. The character “あ” (A of Hiragana) is displayed at the center of the cross-shaped window 120, the character “い” (I of Hiragana) being displayed upper, the character “う” (U of Hiragana) being displayed left, the character “え” (E of Hiragana) being displayed below, and the character “お” (O of Hiragana) being displayed right. At this time, when the Button “1あ” is released, the character “あ” (A of Hiragana) is decided. When, in FIG. 16B, the direction button 114 is operated with the Button “1あ” pressed to press the lower button 116 of the direction button 114, the character “え” (E of Hiragana) at the lower side of the cross-shaped window 120 is decided.

In the character input assist system for the mobile telephones of the present embodiment as well in the character input assist system for the software keyboard, it is possible to change the arrangement of the selection characters in the cross-shaped window 120, the shape of the window, etc.

According to the character input assist system of the present embodiment, times of button operations can be drastically decreased in comparison with the conventional character input.

The character assist system for PDA will be explained with reference to FIG. 17.

In the character input in PDA, a software keyboard 142 is displayed on a screen 140, and a pen 146 touches characters on the software keyboard 142 to input the characters.

To simplify such character input in PDA, in the present embodiment, as shown in FIG. 17, the pen 146 touches a character and continuously touches the character, and then a cross-window 144 is displayed on the software keyboard 142. The associated characters are displayed in the cross-shaped window, and the pen 146 is moved in contact with the screen to thereby select an associated character.

Figure 17A:
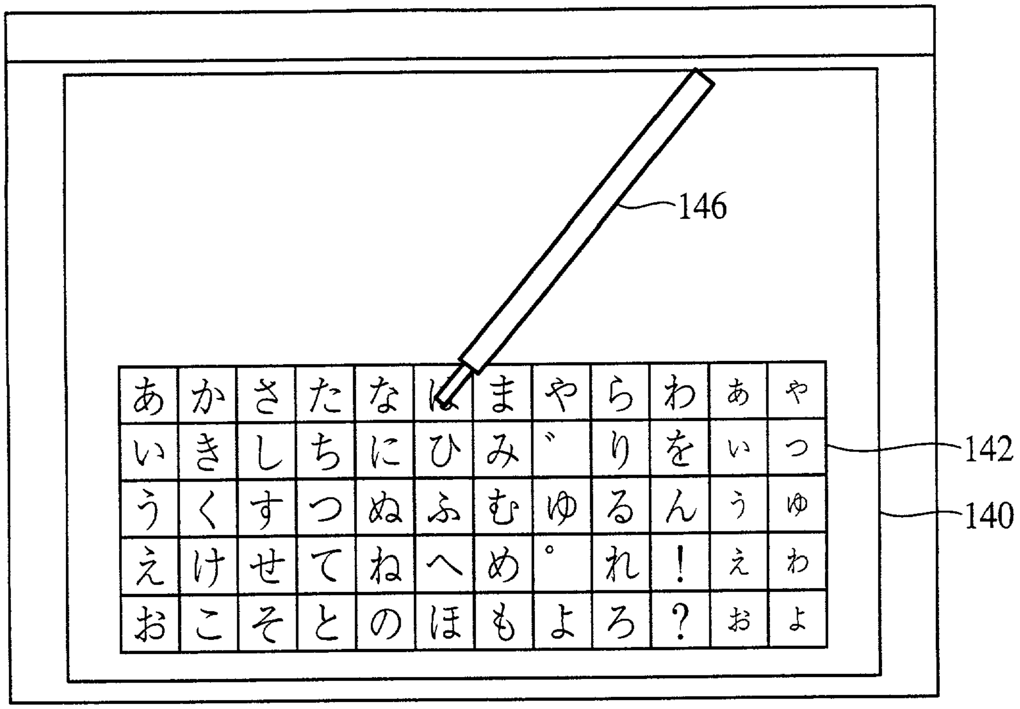
FIGS. 17A and 17B are views explaining the character input assist system of the first embodiment of the present invention for use in PDA.
Figure 17B:
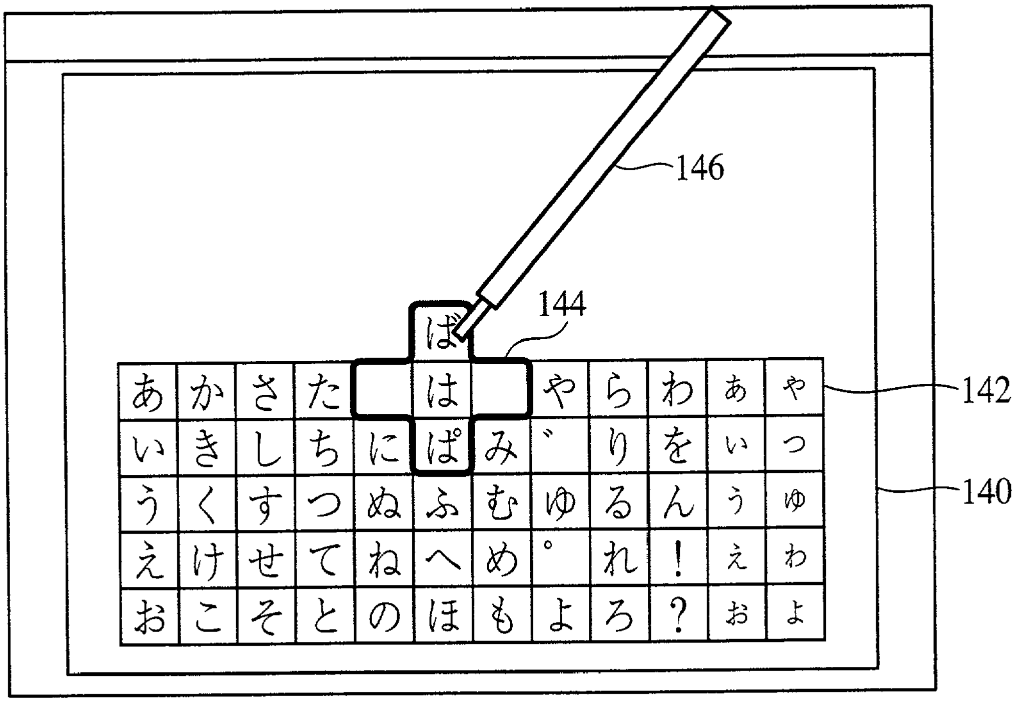

First, as shown in FIG. 17A, the part of the screen 140 of the PDA corresponding to the character “は” (HA of Hiragana) of the software keyboard displayed on the screen 140 is touched with the pen 146. When the pen 146 is kept in touch, as shown in FIG. 17B, the cross-shaped window 144 centering the character “は” (HA of Hiragana) is displayed. The character “は” (HA of Hiragana) is displayed at the center of the cross-shaped window 144, “ば” (BA, a dull sound of HA of Hiragana) being displayed above, and “ぱ” (PA, a p-sound of HA of Hiragana) being displayed below. To input the character “は” (HA of Hiragana), the pen 146 contacting the character “は” (HA of Hiragana) is left from the character “は” (HA of Hiragana). To input the character “ば” (BA, a dull sound of HA of Hiragana), the pen 146 is moved in contact with the screen in the manner as a mouse is dragged, and is left from the screen at the position of the character “ば” (BA, a dull sound of HA of Hiragana).

In the character input assist system for the mobile telephones of the present embodiment as well, arrangement of selection characters in the cross-shaped window 144, shapes of the window, etc. can be modified as in the character input assist system for the software keyboard.

The character input assist system of the present embodiment permits characters to be intuitionally inputted in comparison with the conventional character input.

[A Second Embodiment]

The network system according to a second embodiment of the present invention will be explained.

In the network system according to the present embodiment, a Chao kindergarten for growing characters called Chao is provided. Chao data users own are uploaded to the Chao kindergarten to be put there for a certain period of time in which the chao data spontaneously upgraded. The chao data of the respective users put in the Chao kindergarten influence one another to be upgraded. Characteristically in the present embodiment, the chao data are spontaneously influenced by the data of the other chao data in place of artificially influencing the users data.

In the online game of the present embodiment, characters called Chao to be grown are present in addition to player characters operated by game players. The players can give various items to the chaos to thereby vary forms and skills of the chaos.

In the conventional games, the players have grown the chaos in the online environments of their respective game apparatuses. However, in the present embodiment, the game apparatuses are connected to the network to upload chao data to the Chao kindergarten provided in the server so that the chao data can be grown there.

Figure 18A:
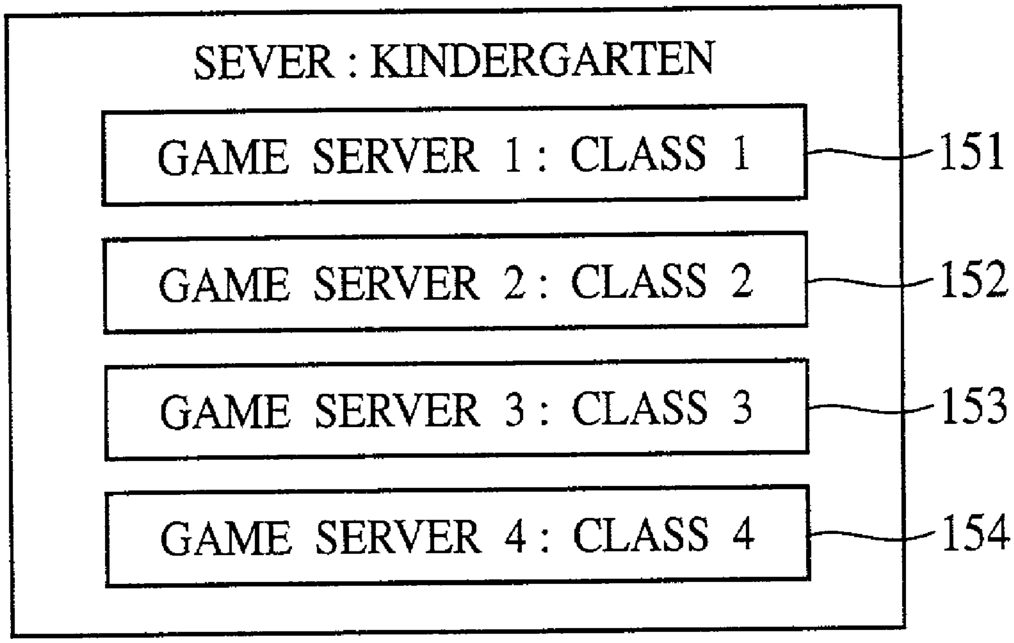
FIGS. 18A and 18B are views explaining the network system according to a second embodiment of the present invention.

As shown in FIG. 18A, the Chao kindergarten is divided in a plurality of servers 151–154. The individual game servers 151–154 are set to be classes of the Chao kindergarten. The users select which classes their chao data to be stored in.

Figure 18B:
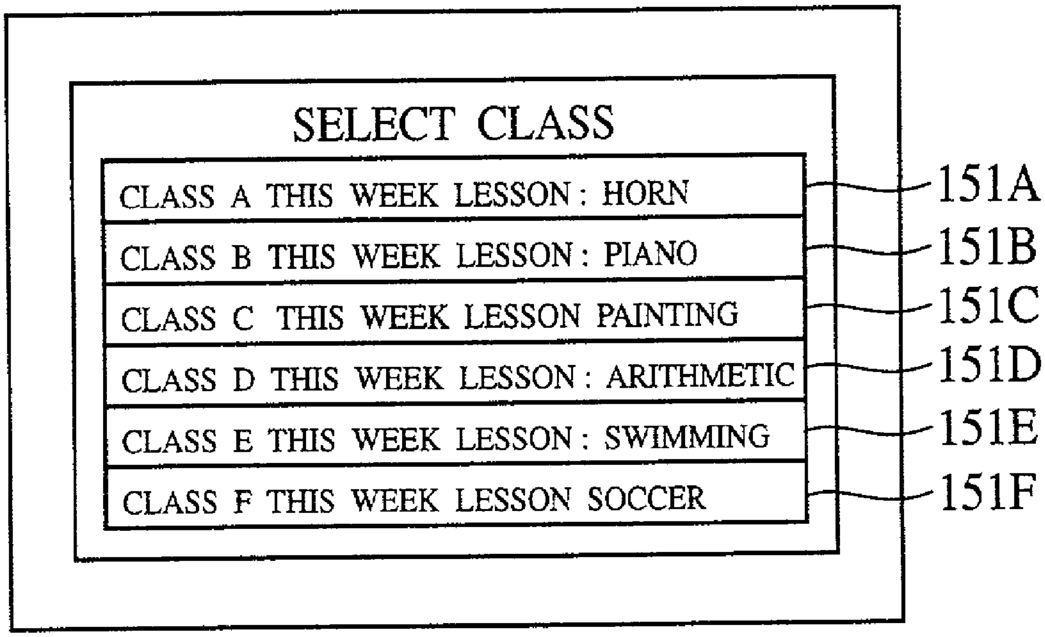

As shown in FIG. 18B, programs 151A–151F respectively setting parameters to be skilled up are incorporated in the game servers 151–154 of the respective classes. The parameters are called lessons and are selected by the users. The users select the classes which are suitable for skills they want to upgrade.

It takes, e.g., 1 day from a time when the chao data were put in to renew the chao data. After 1 day, the users download the chao data for the purpose of receiving the Chaos. Skills corresponding to the classes (lessons) selected when the chao data were downloaded are added. For example, when Horn of Class 151A has been selected, the downloaded Chao has the skill of blowing the horn he did not have before the upload.

Figure 19:
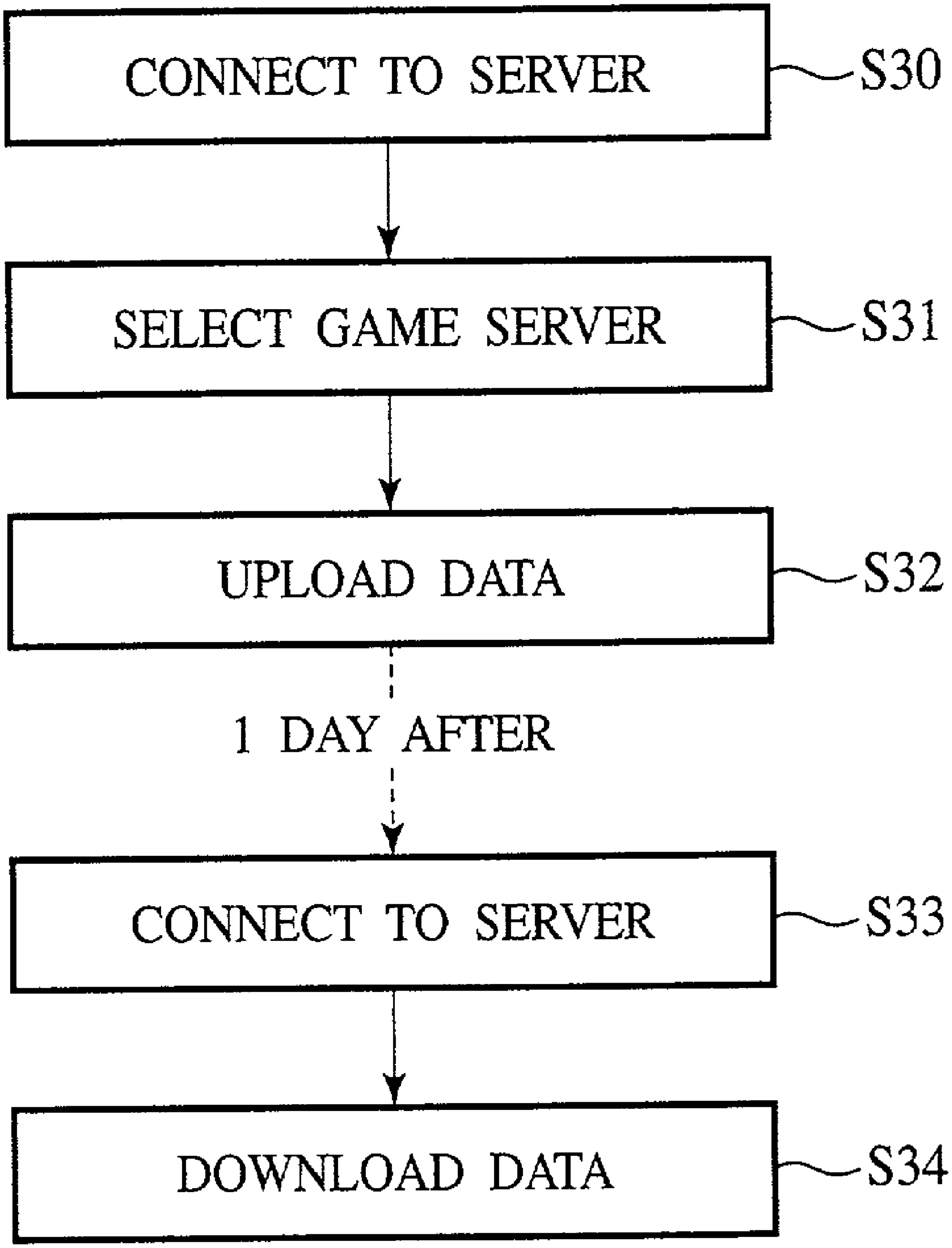
FIG. 19 is a view explaining the network system according to the second embodiment of the present invention.

The sequence of the network system according to the present embodiment will be summarized with reference to FIG. 19.

First, the game apparatus 10 of a user is connected to the server 50 via an internet 60 (Step S30). When the game apparatus 10 is connected to the server 50, the image of the Chao kindergarten shown in FIG. 18A is displayed. One of the displayed game servers 151–154 for the user s Chao to be put in is selected, and the class 151A of horn is selected out of the classes 151A–151F of the game server 151 (Step S31). When the class 151A of horn of the game server 151 has been selected, the chao data is uploaded from the visual memory 40 connected to the game apparatus 1- to the class 151A of the game server 151 (Step S32). Then, the internet is disconnected for 1 day.

The next day, the gap apparatus 10 of the user is connected again to the server 50 via the internet 60 (Step S33). The grown chao data is downloaded from the game server 151 of the server 50 to be stored in the visual memory 40 of the game apparatus 10 (Step S34).

Thus, the chao data is uploaded to the server, and later, the chao data grown in the server is downloaded, and the user can enjoy the growth of the chao data.

In the present embodiment, a plurality of users upload their chao data to one game server, and Chaos having various parameters are co-present in the game server. All the chao data are administered by a data base in the server 60.

In the present embodiment, one and the same server administers chao data of a number of users, whereby uploaded chao data are influenced one another to thereby vary the chao data.

As in the actual world, a child who has been shy begins to go to school and is influenced there by mentally strong children to grow mentally stronger child, parameters of personality and influential power are incorporated in the chao data to thereby cause the same phenomena.

The personality parameter include “crybaby”, “gentle”, “normal”, “mischievous”, “rough”, etc. The influential power parameter includes values of 0 to 100. Higher influential power parameter means higher liability to personality parameters of other Chaos.

Figure 20:
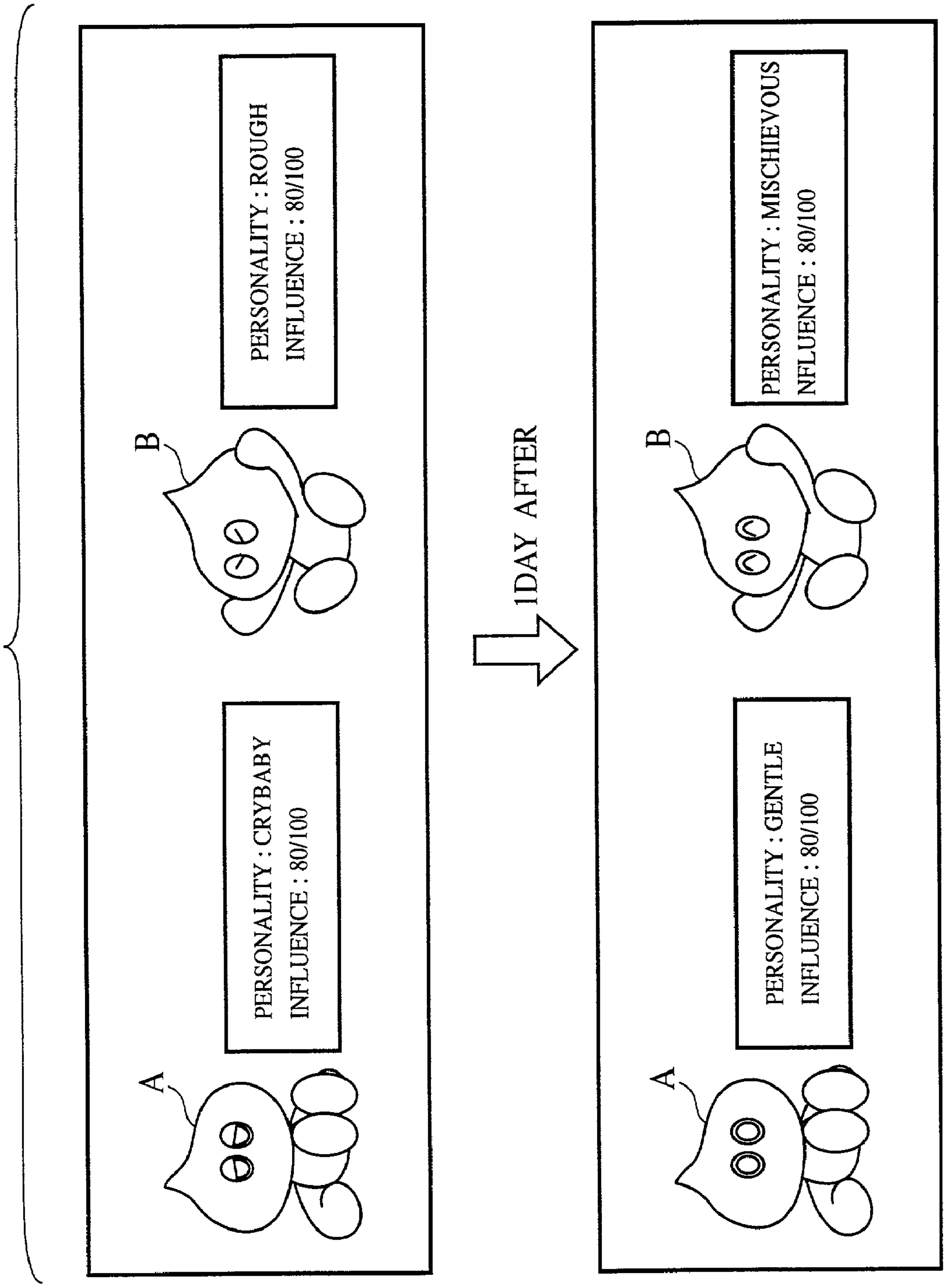
FIG. 20 is views explaining the network system according to the second embodiment of the present invention.

For example, as shown in FIG. 20, in a case that a Chao A whose personality is "crybaby" (influential power: 80/100) and a Chao B whose personality is "Rough" are uploaded to the same class, they are influenced by each other, and after 1 day has passed, the personality of the Chao A has been changed to gentle while the personality of the Chao B has been changed to "mischievous". When the users decide classes, they may decide classes after viewing parameters of the Chaos put in the classes.

[A Third Embodiment]

The network system according to a third embodiment of the present invention will be explained.

According to the network system of the present embodiment, in a network game, questionnaires are sent out to players connected to the network, and results of the questionnaires are reflected on game advances of specific players. In the network system, in a game environment using all network devices, the users evaluate one another to thereby vary game advances of the other users.

For example, in a game, a questionnaire "Who is the most awkward among us?" is made, the players connected to the network respectively inputs their answers. A value of the parameter "sophistication" of a player character A who has won the most answers is lowered. Resultantly, items the game character A can put on during the game are limited. Thus, the network system is characterized in that inputs of other players vary parameters beyond anticipation of the players.

In the above-described example, the players who answer questionnaires are not limited to players taking part in the network game, but also may include users who can be connected to the network via home video game machines, and mobile terminals, such as mobile game apparatuses, mobile telephones, PHS, PDA, etc.

In the conventional online game systems, players called "raiders" are present. The players called "raiders" make harassments, etc. to disturb or kill other players. Such players are nuisances also to the world of the network games. However, from another viewpoint, a motive for making such deeds will be derived from their self-ostentatiousness, and they want to recognize their own presence and strength also in the world of games.

Then, in the present embodiment, the game players evaluate one another to thereby influence positions and roles of the players in the game world, so that the self-ostentation of such players is positively utilized in games.

Figure 21:
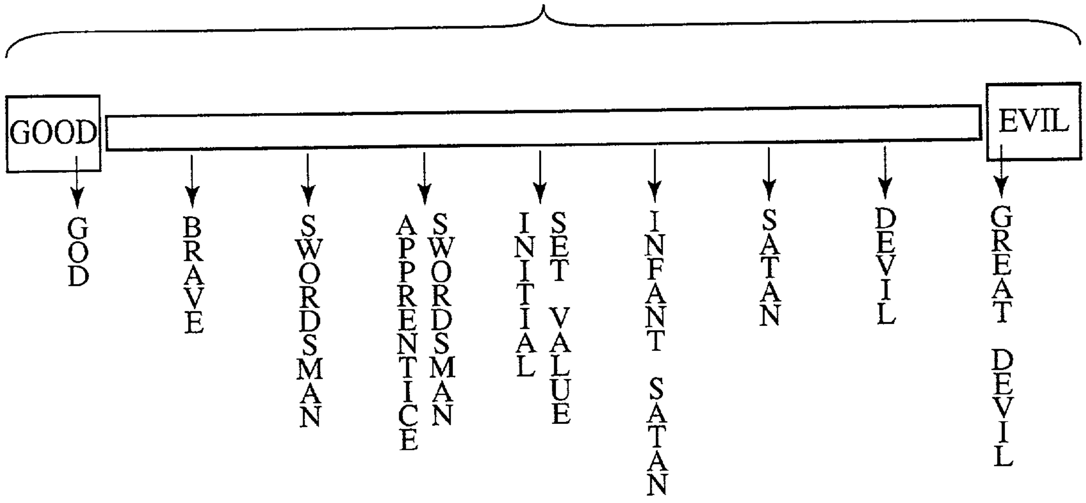
FIG. 21 is a view explaining the network system according to a third embodiment of the present invention.

For example, in a network role playing game, the characters of the game have good and evil parameters. The parameters vary ranks and roles of the characters in the game world. As shown in FIG. 21, the game players whose good parameters are higher are ranked as God, Brave, Swordsman, Apprentice Swordsman, Infant Satan, Satan, Devil and Great Devil. An initial set value of the good and evil parameters is set between the Apprentice Swordsman and the Infant Satan.

The game of the present embodiment has no enemy preset by the system. However, the players positioned in either of the sides, good and evil divided with the initial set value at the middle, and the divided players oppose to each other. When the game players defeat the opposed players, they are skilled up, and the abilities of the characters are raised. Thus, the game of the present embodiment is for the purpose of growing themselves. The final purpose of the players is to defeat God or Great Devil positioned on the opposed sides of the players.

The players positioned at the summits of the good and the evil parameters have higher influential power with the rest players than the players at the other ranks.

A population distribution of the game world is administered by the system so that even when a number of participating users increases, players ranked at both summits are not extremely increased and are always treated as players of scarcity value.

Ranks of the players vary depending on good and evil parameters varied by evaluation made among the players. For example, an owner (NPC) of a shop makes the following questionnaire to a team of 4 players who are exploring. My treasure has been empties before I m aware of it. One of you has stolen!

Figure 22:
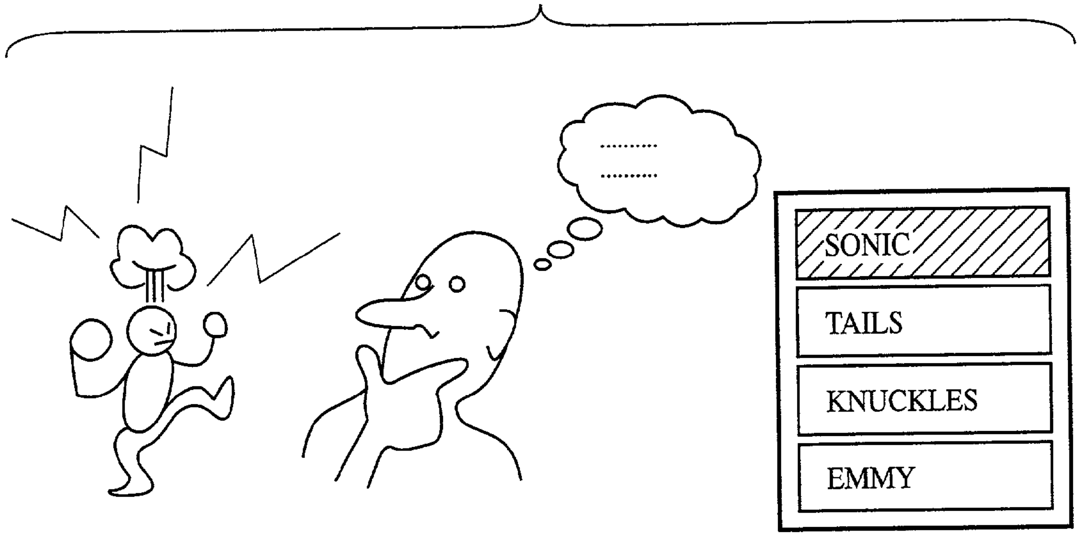
FIG. 22 is a view explaining the network system according to the third embodiment of the present invention.

At this time, as shown in FIG. 22, the names (Sonic, Tails, Knuckles, Emmy) of the respective connected players are displayed as selection items.

If one player selects the player "Sonic", the above-described questionnaire is for increasing the evil parameter, and the good/evil parameter of the player called "Sonic" leans toward evil. When the evil parameter exceed a certain value, the rank of Sonic varies from the initial set value to the Infant Satan.

As players have parameters which are more approximate to the good and the evil summits, they have stronger influence power with respect to the other players. In the above-described case, a player at the rank of Brave can more increase the evil parameter of Sonic by selecting Sonic than a player at the rank of Swordsman.

By using the above-described system, ranks can be formed in the world of a game, but also the following communication can be enjoyed.

For example, in a network survival game, the stage is an uninhabited island. The players taking part in the game wait for rescue, obtaining materials for living.

To clear the stage, the players must survive without dropping out, to be rescued. When the players are rescued, the players have cleared the stage and can advance to a next stage.

In this game, one drop-out is decided every time at the end of one day. Accordingly, the game is over for a player when the player has lost physical force for the survival, or when a player is decided to be a drop-out.

The players respectively have parameters of "skill" and "taste". The skill includes "being good at fishing", "being good at collecting fruits", "being good at hunting", etc. These skills and "tastes" of the players depend on each other. The players who like meat cannot gain physical strength unless they eat meat. They must inevitably ask the players who are good at hunting to hunt.

However, the basic purpose of each player is to drop out the other players, and the players do not easily accept requests of the other players. Each drop-out player has one vote of a judge, and to clear the game, it is an essential condition to cooperate with the other players. This is a strategic point.

For example, four players respectively called "Sonic", "Tails", "Knuckles" and" Emmy" are present. The player "Sonic" sends a mail "Let's drop out Knuckles next!" to the player "Tails" to ally with the player "Tails".

Here, it is presumed that the player "Tails" has rejected before the request of the player "Emmy", and in place, the player "Sonic" has accepted the request. Then, the player "Tails" is seized with a suspicion that if the player "Emmy" survives, then I will be dropped out.

Then, the player "Tails" sends a mail "Let's drop out Sonic next!" to the player "Knuckles" to ally with him so as to drop out the player "Sonic" first.

Thus, kind deeds lead to scores in the usual games, but in this network game, players are evaluated by players to thereby cause proceeding situations where it is not seen how deeds of the players will turn out. The strategic game property characteristically produced by such communications among players is produced, which makes the game very interesting.

[Modifications]

The present invention is not limited to the above-described embodiments and cover other various modifications. For example, in the above-described embodiments, the network system according to the present invention is applied to home video game machines as information processing devices but is also applicable to terminal devices installed at shops, such as game centers, game cafes, etc., mobile game apparatuses, electronic devices, such as personal computers, etc. in respective homes, mobile terminals, such as mobile telephones, PHS, PDA, etc., and others.

in the game apparatuses of the above-described embodiments, the present invention is applied to chats but is applicable also to communications other than chats.

What is claimed is:

1. An input processing method for a multi-user system comprising a plurality of information processing devices operated by users of the system, each user of the system being associated with a player character in a virtual environment shared by each user of the system, the method comprising:

at each one of the plurality of information processing devices:

receiving an input string from a user of the system associated with the information processing device;

connecting to a network;

sharing information, including said input string, over said network; and processing the shared information to create the virtual environment shared by each user of the system, if said input string contains a string from a set of predetermined strings, triggering a specific event in the virtual environment;

if said input string does not contain any string from the set of predetermined strings, displaying the input string to each user of the system, wherein said virtual environment is a virtual chat room, said specific event is a motion of one of the player characters, and wherein when the user associated with the information processing device inputs the input string, the motion of the player character of the other users responds to the input string.

2. The method of claim 1, wherein said users of said system are operating said plurality of information processing devices to perform a common task while performing said step of receiving.

3. The method of claim 1, wherein the specific event comprises at least one of:

changing images and/or data associated with at least one player character of the virtual environment;

changing an image and/or data associated with an object of the virtual environment;

changing a background image or a music of the virtual environment; and changing the common task.

4. The method of claim 1, wherein the set of predetermined strings includes a character for controlling the specific event.

5. The method of claim 1, wherein the set of predetermined strings include a character which specifies an object in which the specific event takes place.

6. The method of claim 1, wherein the specific event which is triggered is based on which specific string from the set of predetermined strings is included in the input string.

7. A program code being embodied on a computer-readable medium and comprising computer instructions, said program code being executed on a computer to execute a method according to any one of claims 1, 2, 3, 4, 5, and 6.

8. An information storage medium for storing a program comprising computer instructions, said program being executed on a computer to execute a method according to any one of claims 1, 2, 3, 4, 5, and 6.

9. An electronic device comprising a processor for executing computer instructions to execute a method according to any one of claims 1, 2, 3, 4, 5, and 6.

* * * * *